Nov. 14, 1933.  R. A. JONES  1,935,269
CARTON LOADING MACHINE
Filed March 1, 1930   18 Sheets-Sheet 3

INVENTOR
BY *Ruel Anderson Jones*
*Wood & Wood* ATTORNEYS

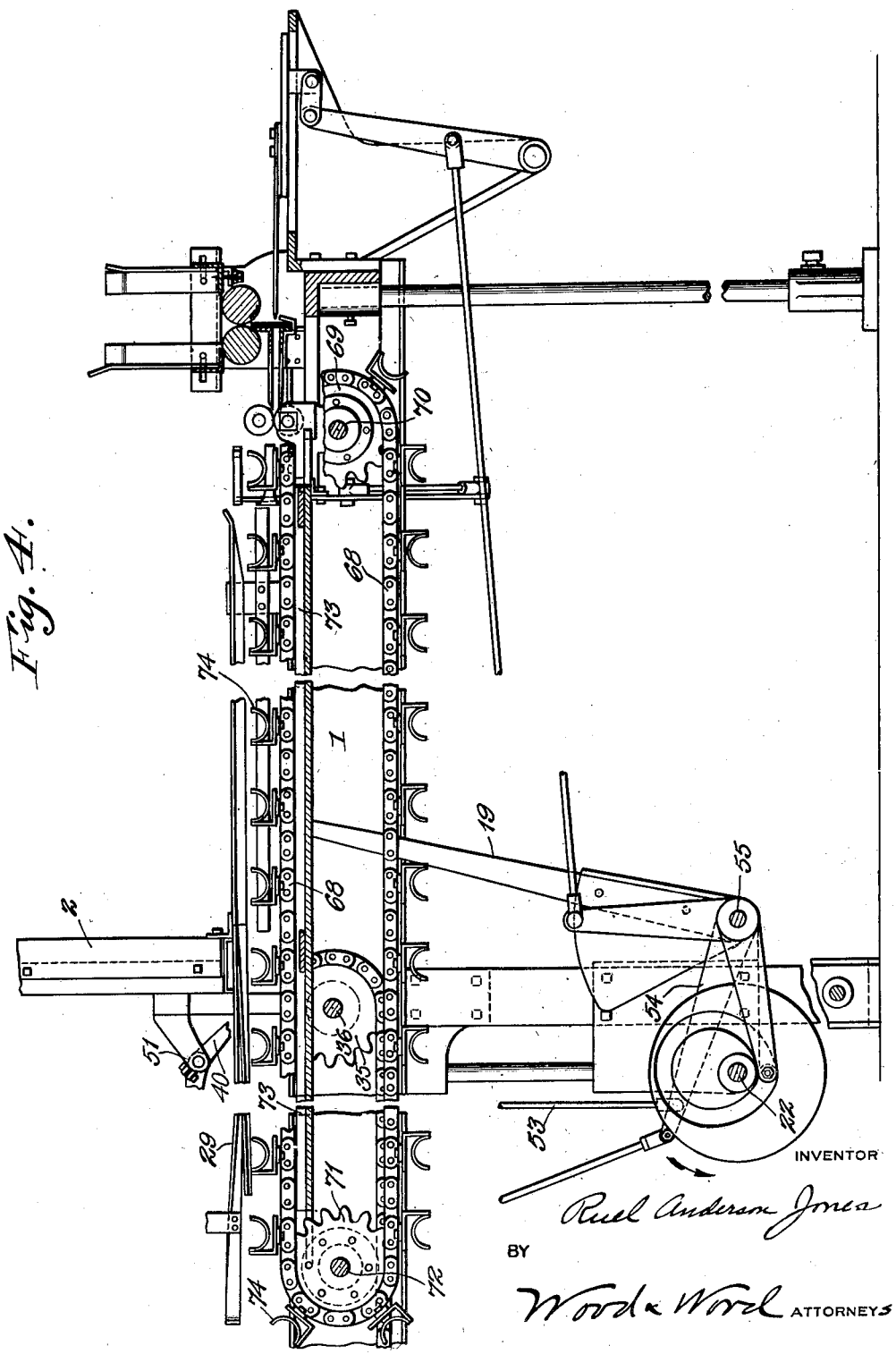

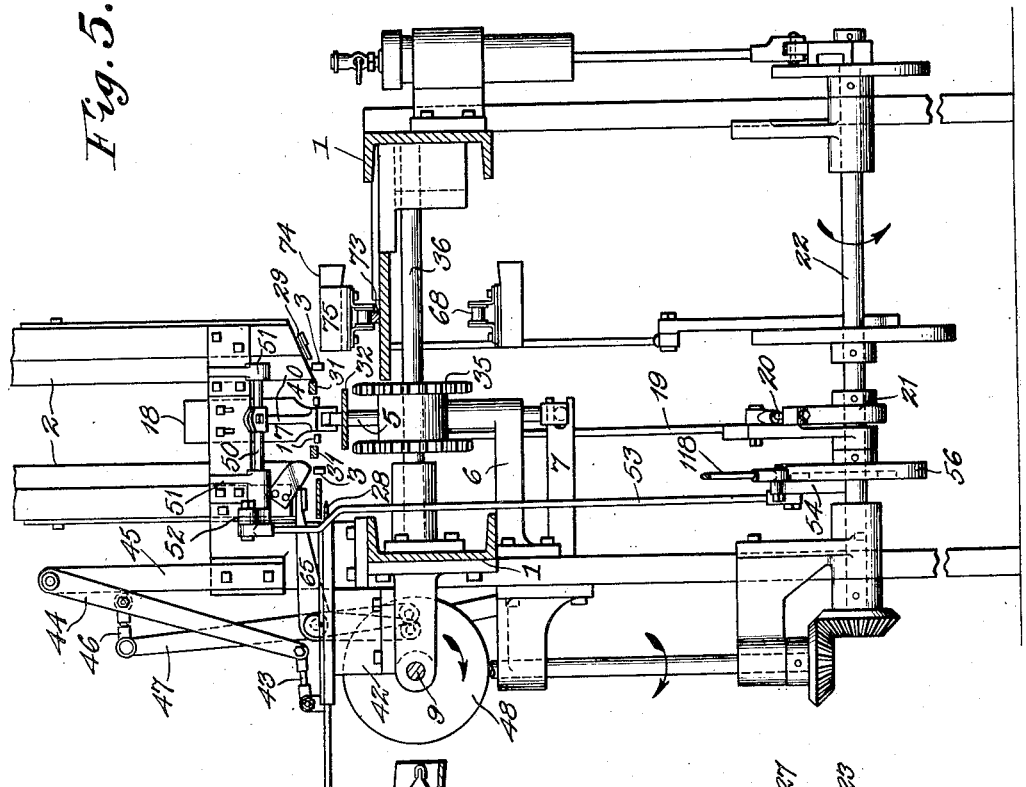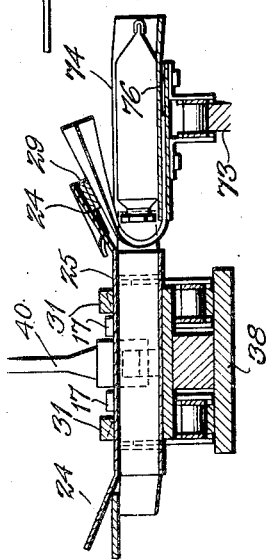

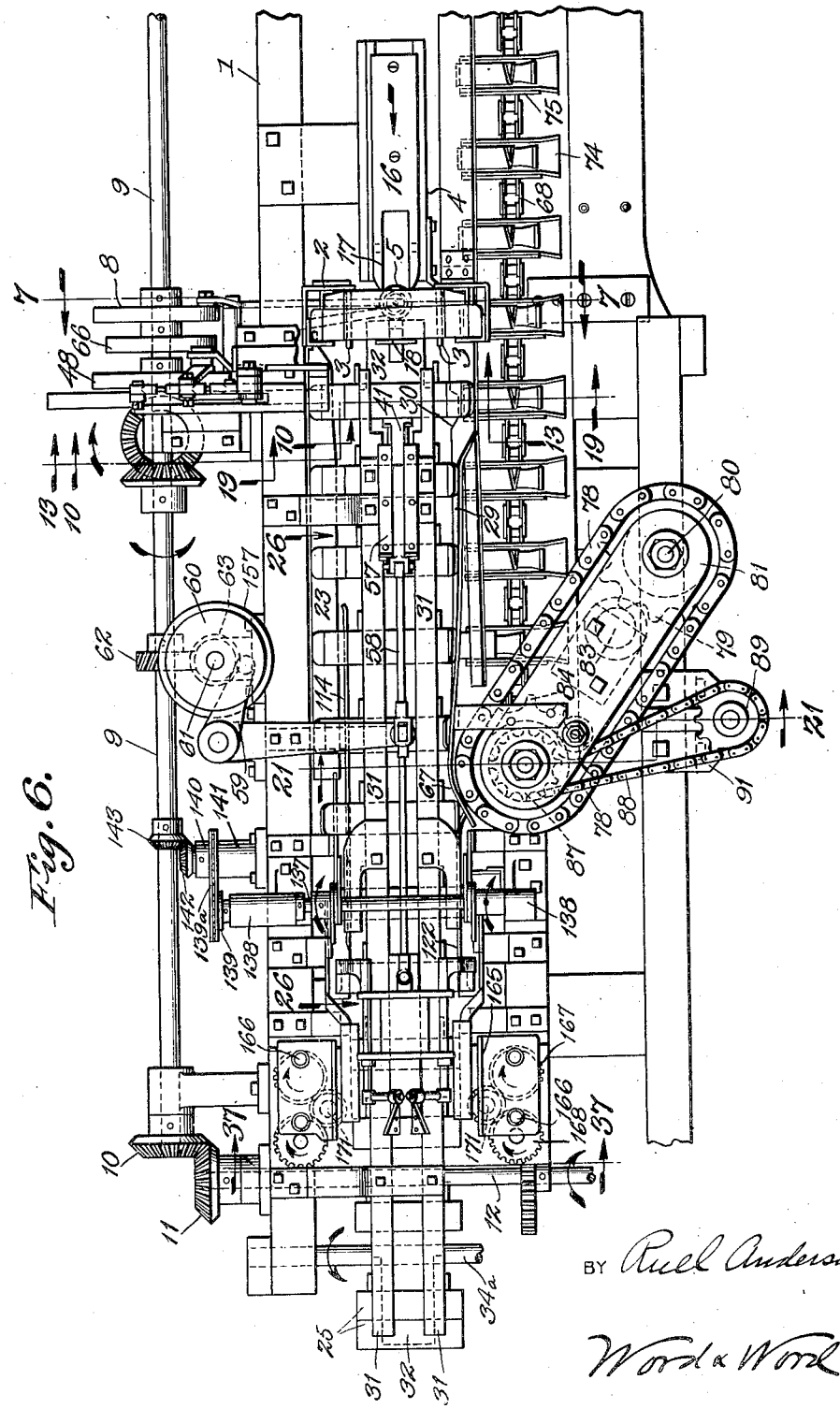

Nov. 14, 1933.  R. A. JONES  1,935,269
CARTON LOADING MACHINE
Filed March 1, 1930  18 Sheets-Sheet 7
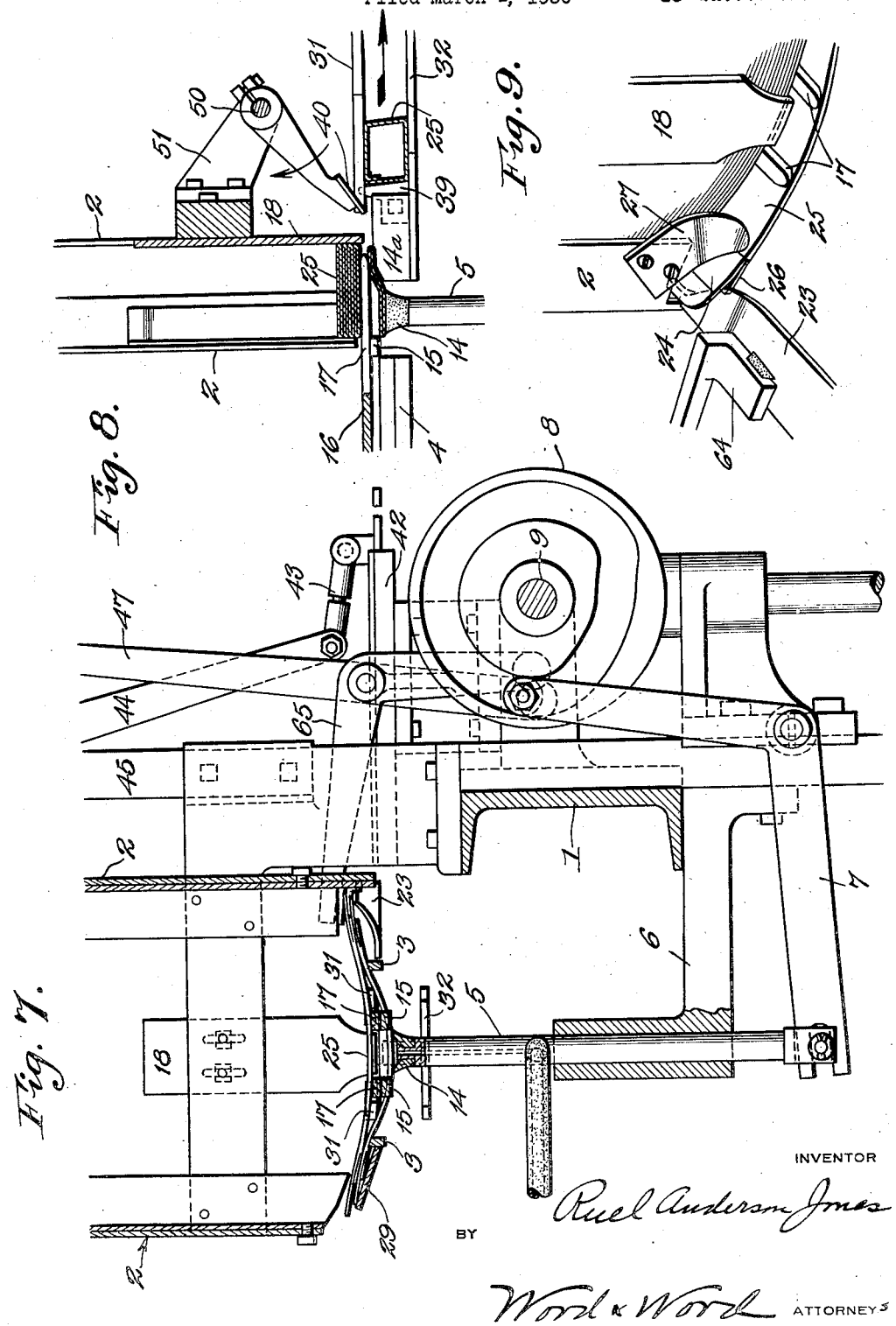

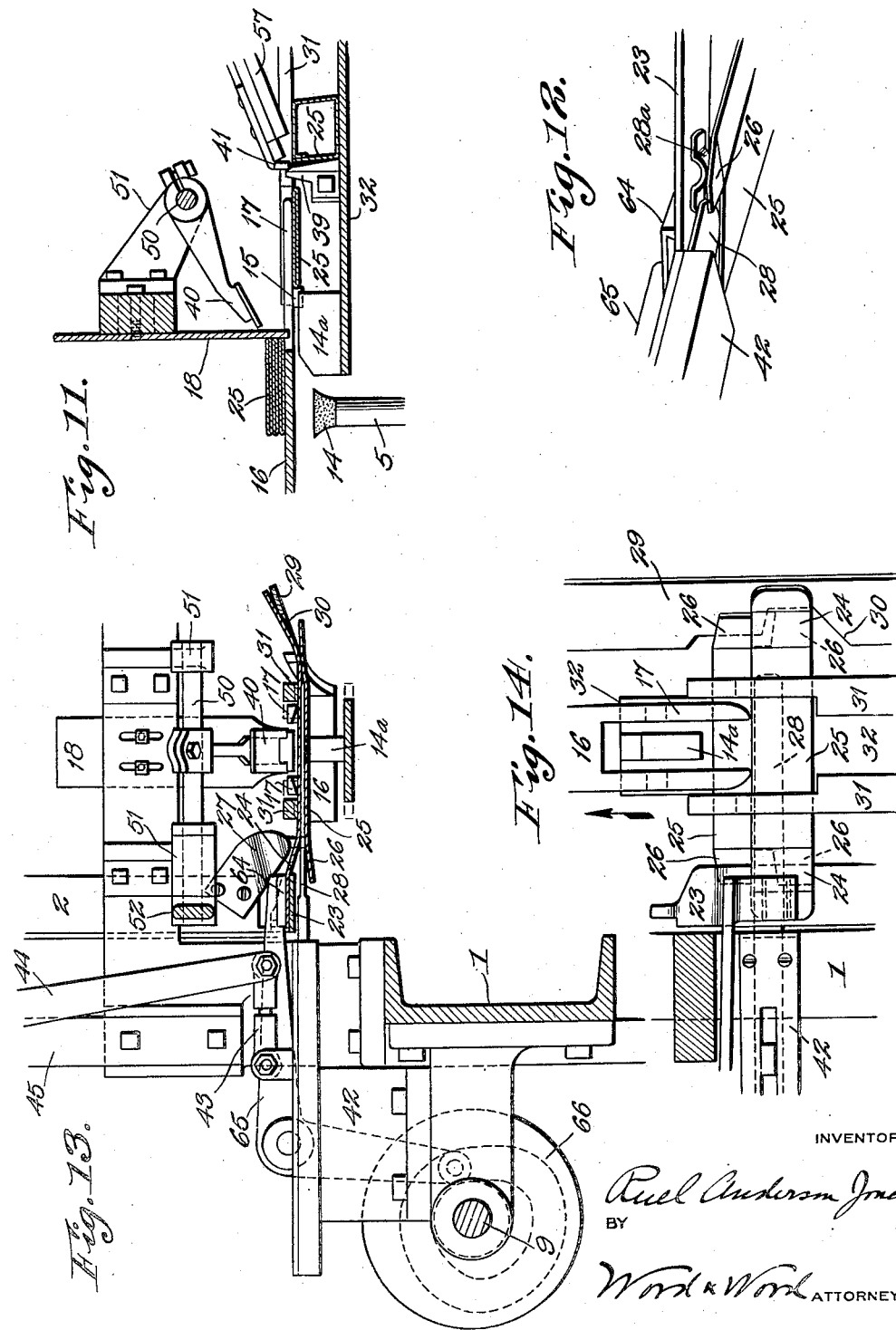

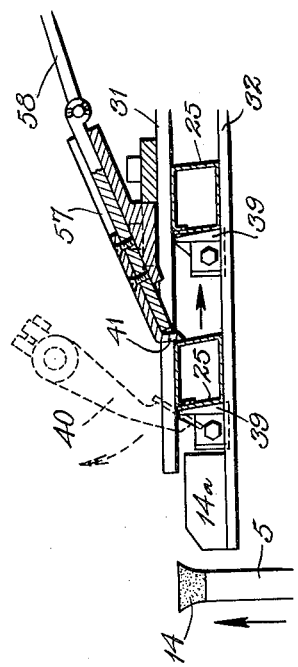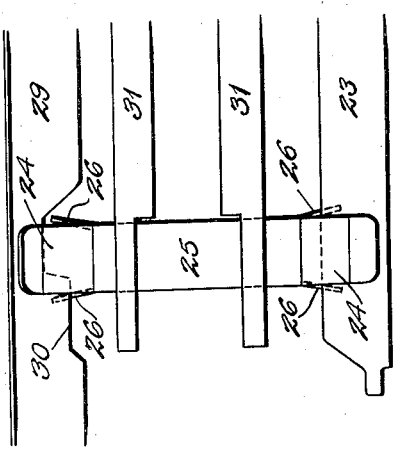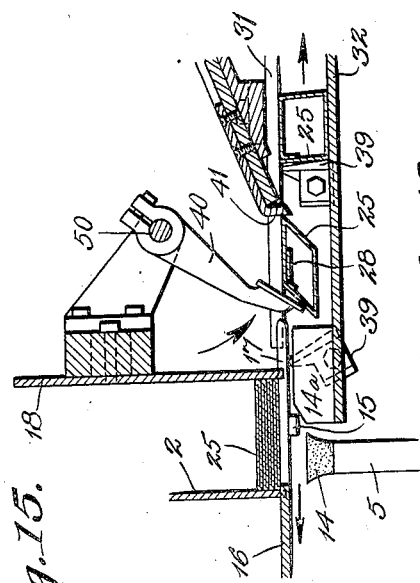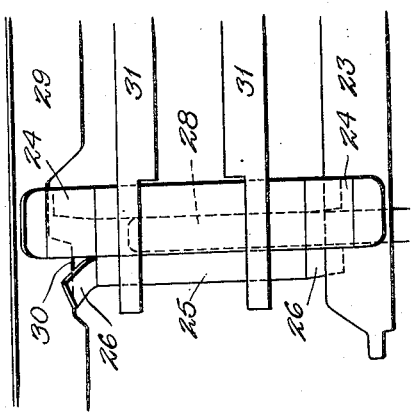

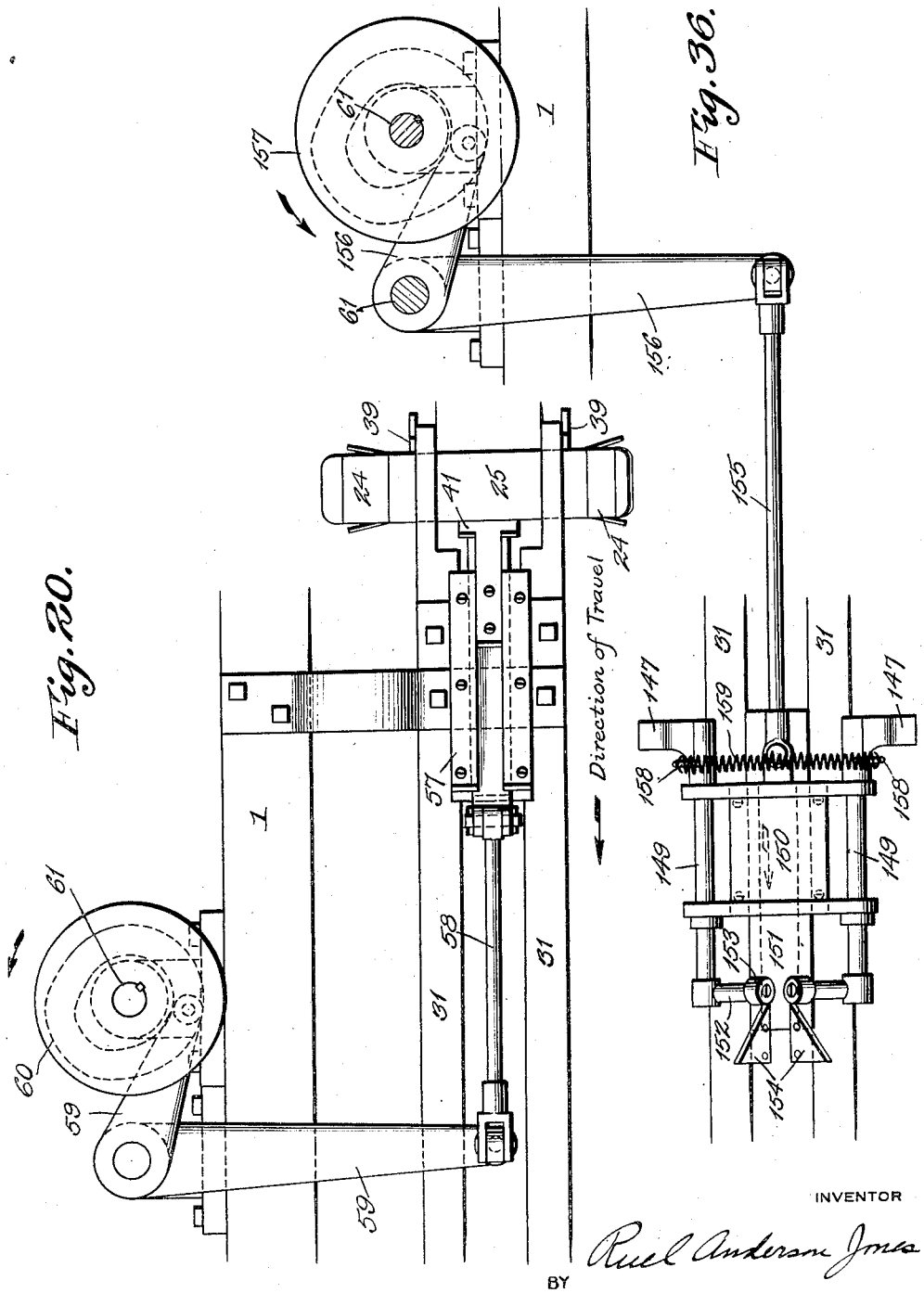

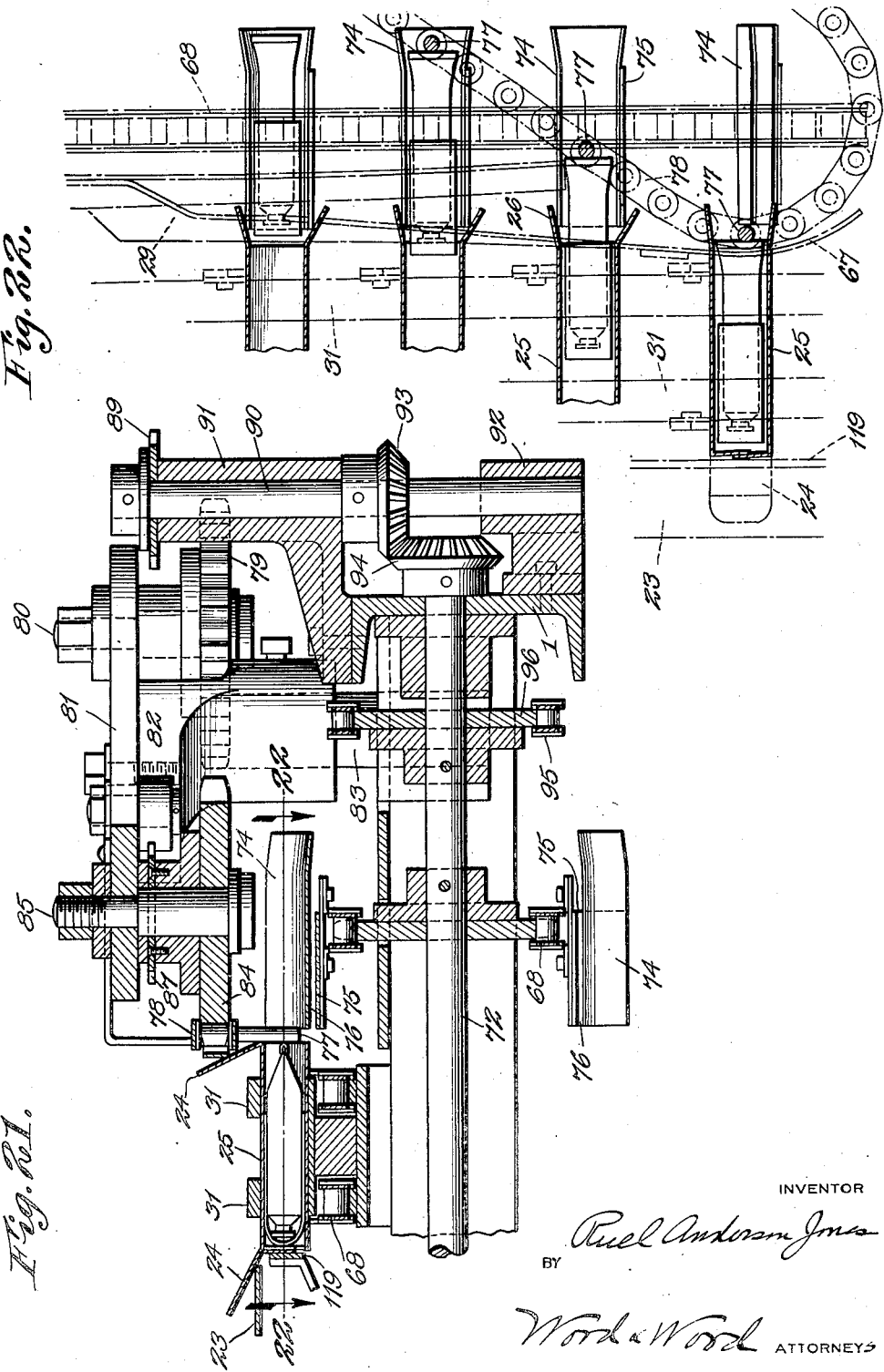

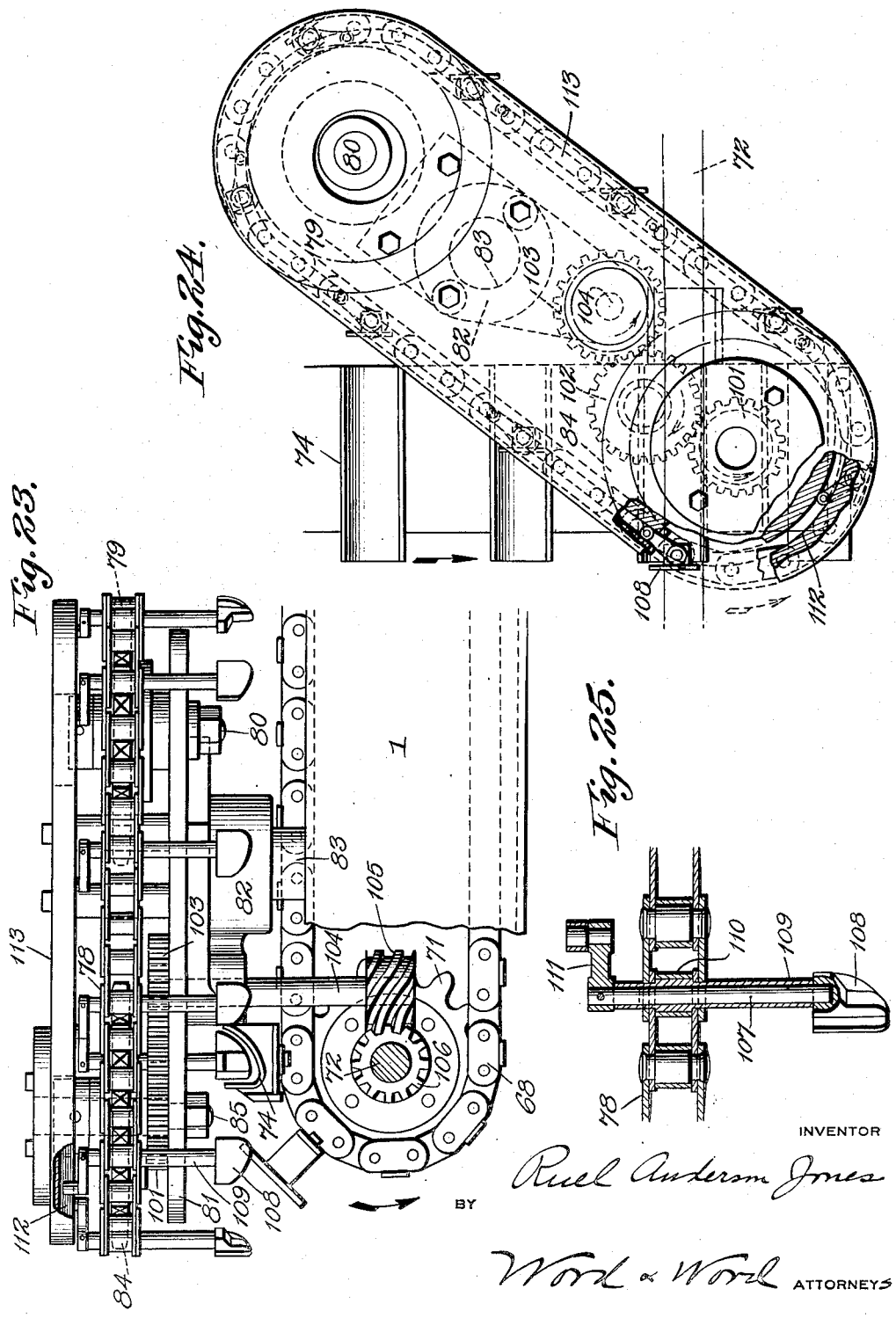

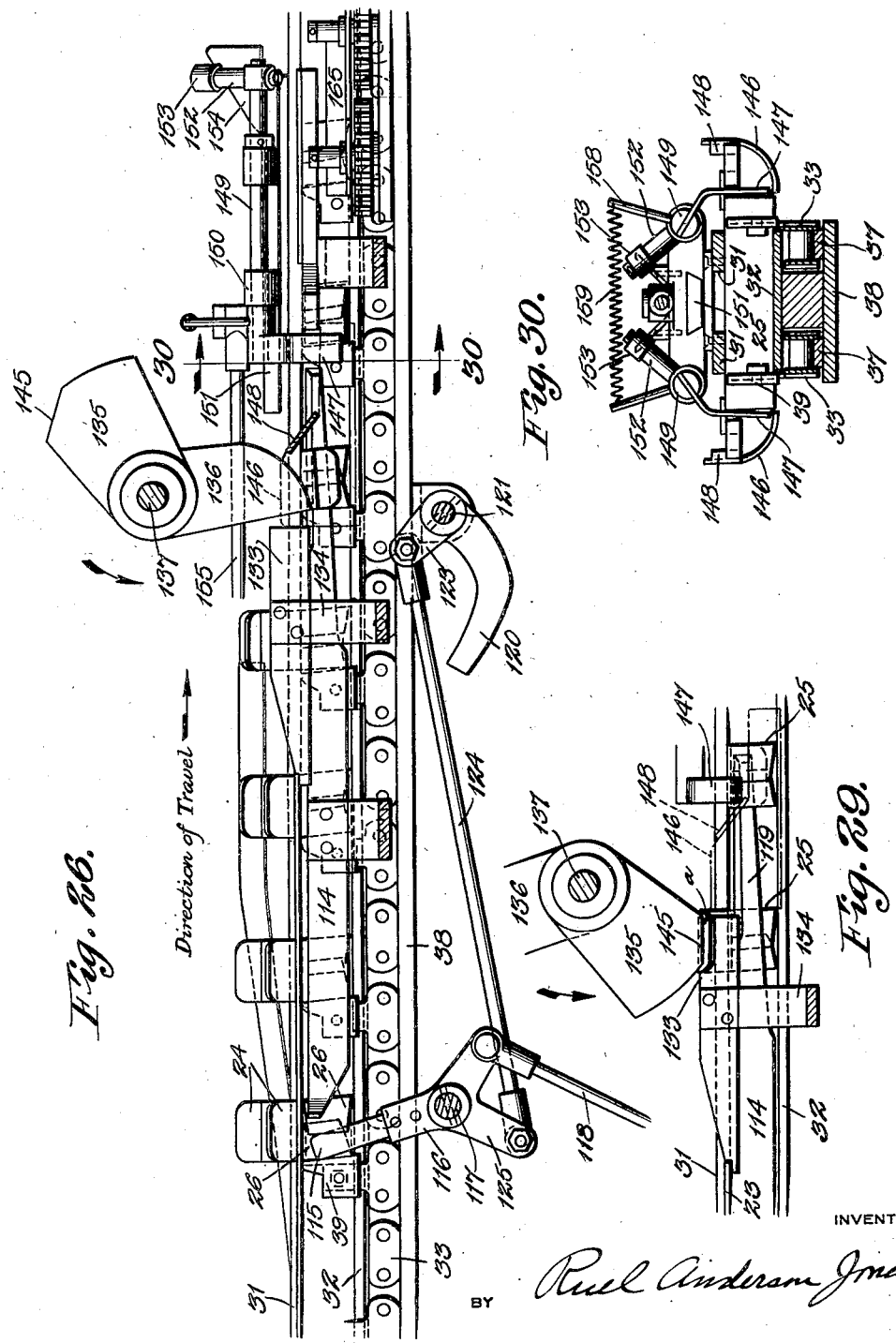

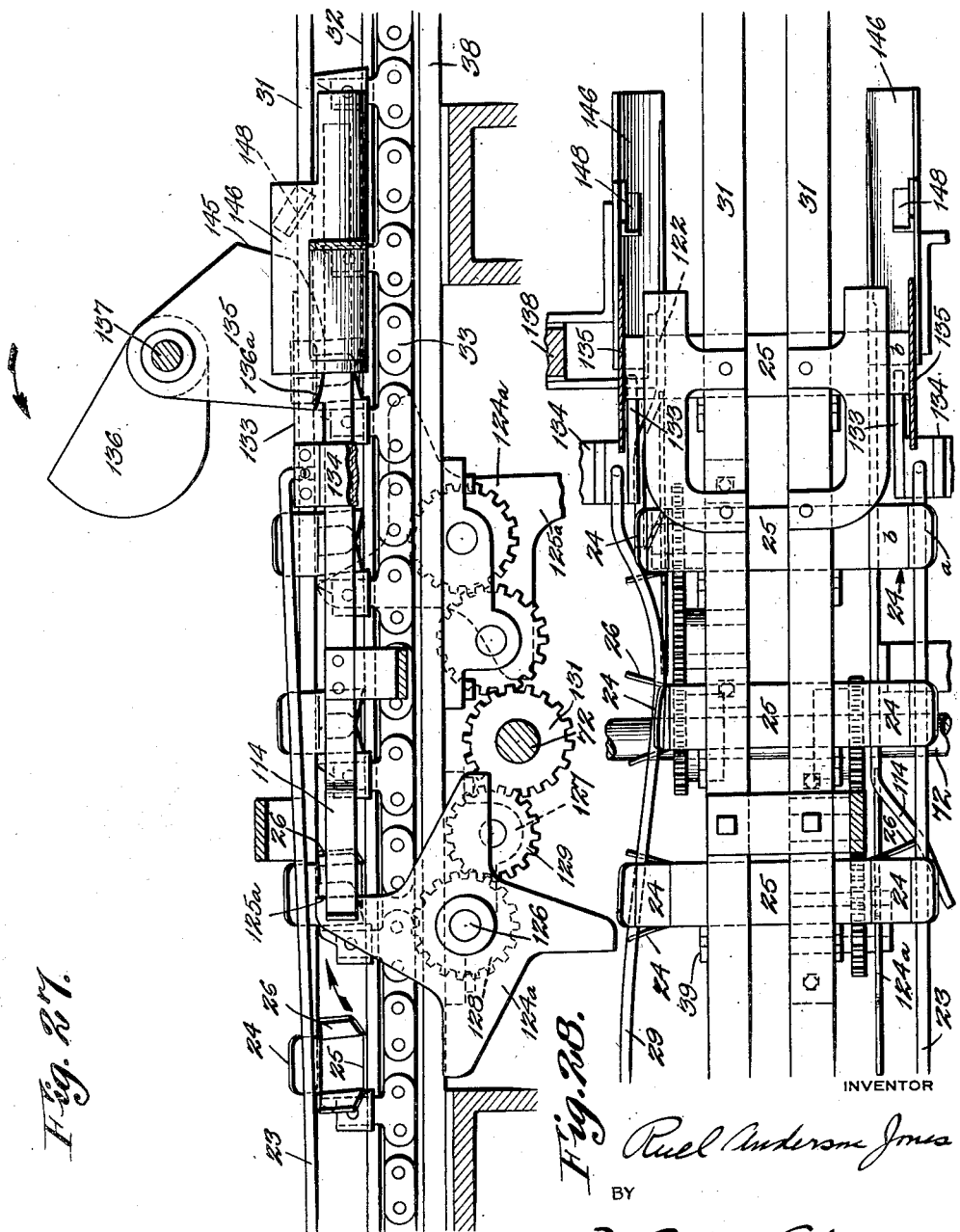

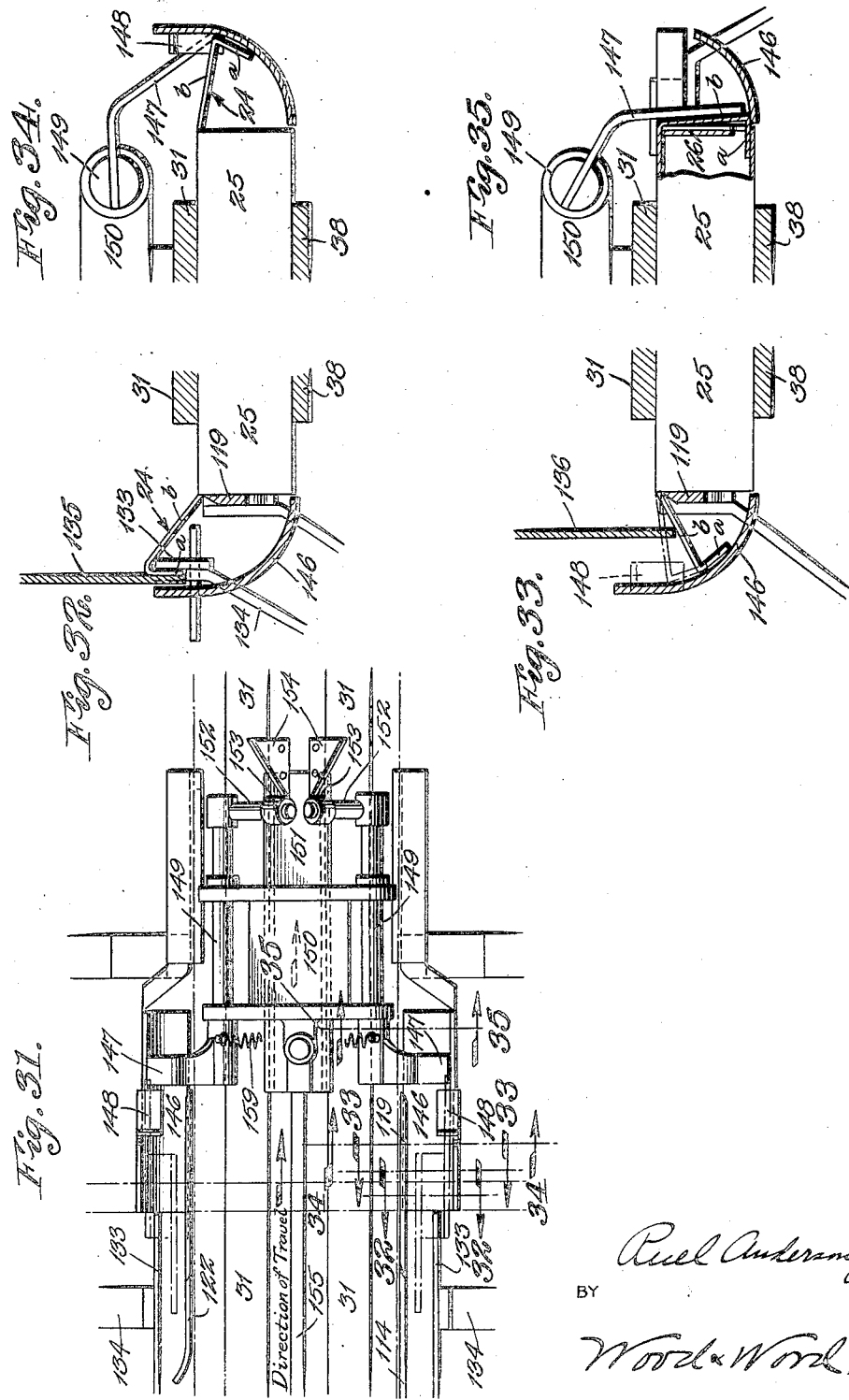

Nov. 14, 1933.  R. A. JONES  1,935,269
CARTON LOADING MACHINE
Filed March 1, 1930    18 Sheets-Sheet 16
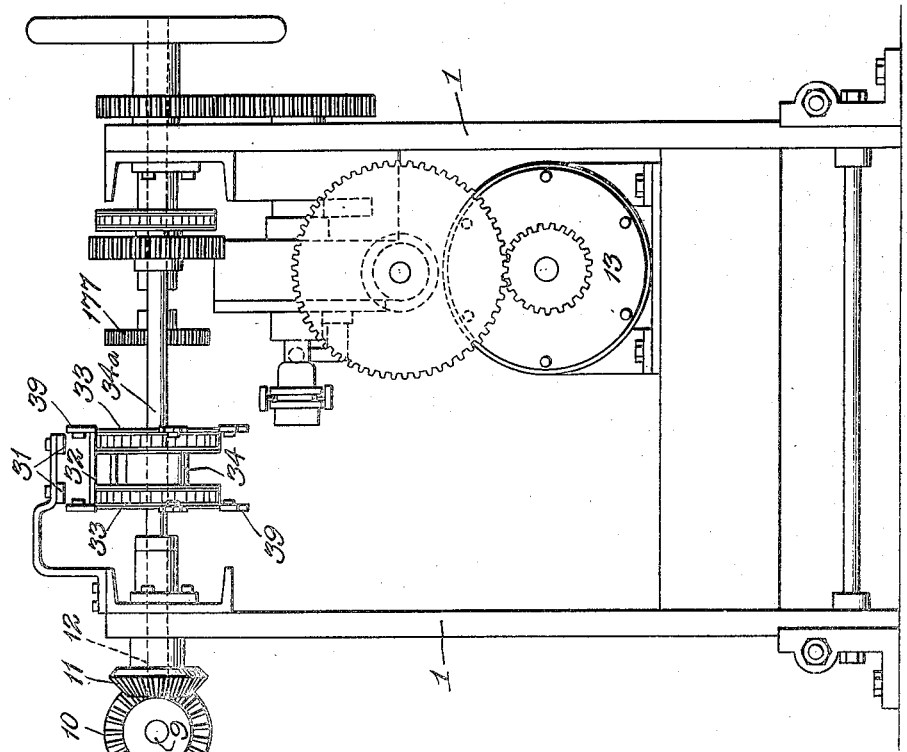
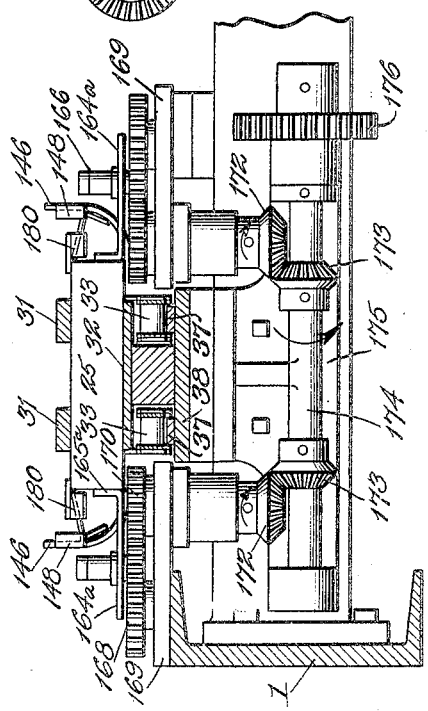
INVENTOR
Ruel Anderson Jones
BY
Wood & Wood ATTORNEYS

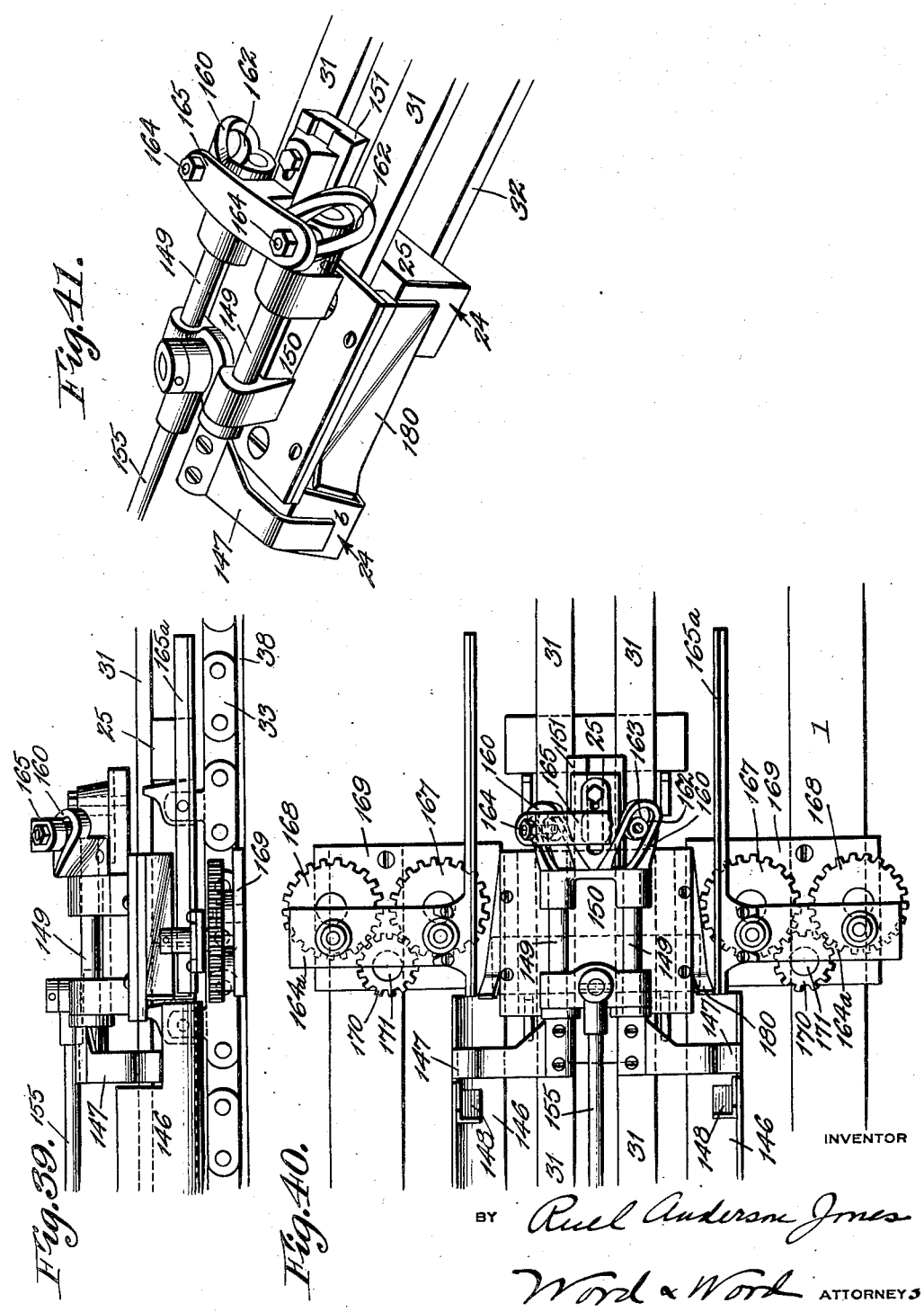

Nov. 14, 1933.      R. A. JONES      1,935,269
CARTON LOADING MACHINE
Filed March 1, 1930      18 Sheets-Sheet 18
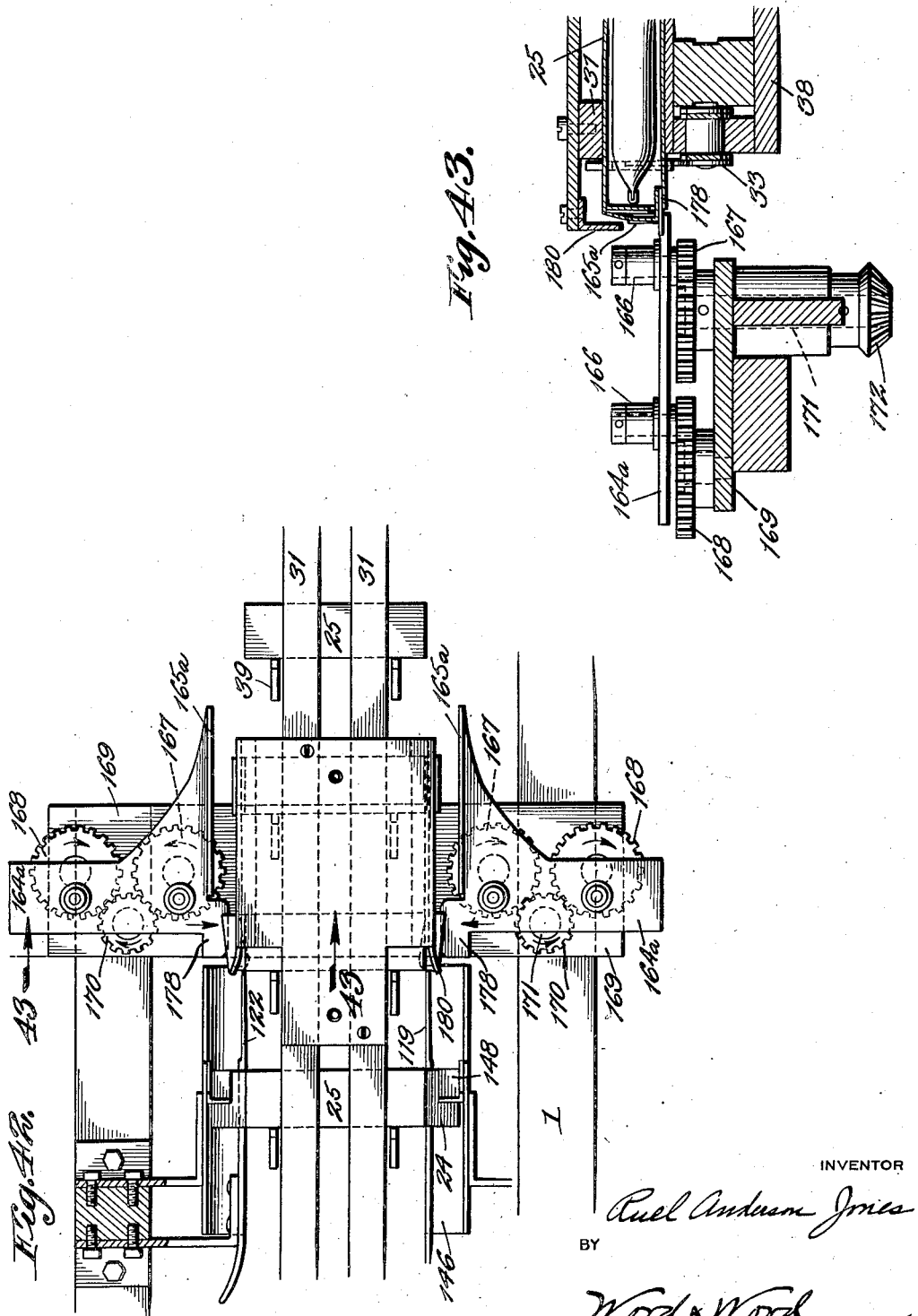
INVENTOR
Ruel Anderson Jones
BY
Wood & Wood ATTORNEYS Patented Nov. 14, 1933

1,935,269

UNITED STATES PATENT OFFICE 1,935,269

CARTON LOADING MACHINE

Ruel Anderson Jones, Covington, Ky., assignor to R. A. Jones & Company, Inc., Covington, Ky., a corporation of Kentucky Application March 1, 1930. Serial No. 432,452

24 Claims. (Cl. 93—6)

This invention relates to improvements in carton filling machines using a carton manufactured and supplied to the user in a collapsed or flat condition and of a type rectangular in section having closure flaps at relatively opposite ends, the closure for an end of the carton effected by three flaps, two folding inwardly from opposite parallel side walls of the carton and overlapping one another, and a third as a tucking flap having a portion closing over the folding flaps with a tucking end engaged into the carton.

The invention comprehends receiving the flat collapsed carton horizontally from a stack, opening and squaring the sides of the carton and confining the same against collapse by the rails extending longitudinally of the direction of travel of the machine; filling the carton with merchandise or articles customary to enclose in cartons of this type and closing the flaps during the continuous travel of the carton, and in some instances including printed or circular matter in folded condition with and about the marchandise.

The travel of the carton when once started through the machine continues uninterruptedly, the merchandise to be packed into the carton moving coordinately alongside of the loading end of the carton and pushed therein by a loader mechanism while the carton moves at its normal speed.

The cartons are supplied to a carrier or conveyor in a collapsed form and automatically opened and squared before the conveyor travel is effective upon the carton and therefore deposited within a pocket or pocket space of the carrier under more favorable conditions and latitude than would be possible in attempting to deposit an open carton within the pocket of the conveyor. The carton is opened and squared within the pockets at which period the carton is at rest and the conveyor provides an excessive pocket space to allow the carton to be fully opened before the conveyor contacts therewith to convey the same, the carton being held against recollapse by superposed stationary rails between which the carton slides as it is being conveyed or impelled.

The end flaps of the carton in either its collapsed or squared condition lie in substantially the same plane as that of the wall with which they are continuous, thus leaving the opposite ends of the carton open. When the carton is open the folding flaps extending from the side walls are in a vertical position while the tucking flaps extending from the opposite ends of one of the face walls lie in a horizontal position and according to the preferred position in which the carton lies within a pocket of the conveyor extend from an upper wall adapting the same to be sustained by longitudinal rails or guides at the loading end for swinging the tucking flap upwardly and rearwardly out of the way and non-interfering to the loading operations while the tucking flap at the opposite end continues to lie in its normally horizontal or straight position in plane with the wall of the carton.

The merchandise is deposited within open-ended pockets carried by a continuous conveyor and moves alongside the cartons respectively in registry with the open ends of the carton, adapting the marchandise to be pushed into the cartons successively and progressively with the continued movement of both cartons and merchandise by finger devices entering the merchandise holder from one end moving transversely to the feeding motion of the merchandise and also in the same direction therewith, the finger depending from a continuously moving conveyor or carrier so that the loading of the merchandise into the cartons is continuous.

The folding flaps at the far end of the carton are closed initially to loading and slide along a rail holding the flaps closed serving to restrain the carton against lateral motion under any loading pressure. After the carton is loaded the folding flaps at the loading end are closed whereupon the tucking flaps at both ends of the carton are simultaneously closed. Finally the closed carton is compressibly engaged to compactly close the ends and then be delivered from the machine.

An object of this invention is to provide an improved machine for filling and closing the flaps of the opposite ends of the carton in an expedient manner during the continuous conveyance or traveling of the carton.

Another object of the invention is to load a continuously conveyed or traveling carton with merchandise coordinately moving with the carton and along the open end thereof and pushing the merchandise into the carton by continuously moving loader devices moving in compound direction with the merchandise and carton and laterally to the direction of such motion for progressively pushing several pieces of merchandise into several respective cartons progressively and simultaneously.

Another object of the invention is to provide a carton loading and flap closing machine in which the various operations necessary toward loading the carton and closing the carton flaps is accomplished by devices having continuous motion or automatically performed under the conveying motion of the carton, simplifying the construction of the machine and the operating parts and obtaining greater efficiency in operation at increased capacity.

Another object of this invention is to simultaneously operate upon the closing tucking flaps of a carton at the opposite ends thereof and in relatively counter directions so that any closing pressure imparted is equal and uniform from opposite ends of the carton, adapting the carton to be compressively confined therebetween and during its continuous travel for effecting a more compact closure of the flaps.

Another object of the invention is to suspend a flat collapsed carton by its flaps as wings, leaving the body free to be engaged or compressed from opposite sides to open the same.

Other objects and further advantages will be more fully apparent from the description of the accompanying drawings, in which:

Figure 4 is an enlarged section on line 4—4, Figure 1.

Figure 5 is an enlarged section on line 5—5, Figure 1.

Figure 6 is a top plan view of the machine similar to Figure 1, with the sheet folding mechanism omitted, and including the endless carrier for conveying the merchandise to be packed and the mechanism for positioning the conveyed merchandise into the cartons.

Figure 7 is an enlarged central vertical section taken crosswise of the machine of the lower portion of the magazine holding a supply or pile of flapped or knocked-down cartons, and the method beneath the magazine for operating upon the lowermost carton of the stack or pile to position the same for ejection from the magazine.

Figure 8 is a vertical section through the lower portion of the magazine lengthwise of the machine, showing forked plunger ejector engaging the lowermost carton.

Figure 9 is a detailed perspective view of the lower portion aft side of the magazine, illustrating a stationary finger for engagement with one of the flap ends of the carton as it commences to leave the magazine for depressing the lowermost flap beneath a longitudinal rail.

Figure 10 is a detailed cross sectional view on line 10—10, Figure 6, showing the cam and lever mechanism for operating a carton opening blade.

Figure 11 is a detailed central vertical section of the carton opening mechanism with carton shown completely ejected and placed within its sphere of action.

Figure 12 is a detailed perspective view of the forward end of a carton opening blade movable transversely of the machine for engaging into the flat carton to initially separate the superposed sides thereof.

Figure 13 is an enlarged section on line 13—13, Figure 6, showing the tuck flap clamp engaged upon the flaps of a carton while the opening blade runs through the carton.

Figure 14 is a detailed top plan view of the carton clamped to a side rail and with the opening blade run through the carton as shown in Figure 13.

Figure 15 is a detailed sectional view similar to Figure 11, showing a step in the operation of the mechanism for opening the carton.

Figure 16 is a top plan view of the rails between which the carton is engaged in the process of opening, the carton being shown in plan in a partly open position as shown in Figure 15.

Figure 17 is a detailed sectional view similar to Figure 15, with the carton in its fully opened position.

Figure 18 is a view similar to Figure 16, with the carton in the position as shown in Figure 17.

Figure 19 is a transverse sectional view on line 19—19, Figure 6, but showing the carton fully opened and with bucket of conveyor carrying merchandise tube and circular shown alongside and advancing simultaneously therewith.

Figure 20 is a fragmentary plan view showing the operating cam, lever, and connection for operation of the carton opening plunger.

Figure 21 is a vertical sectional view on line 21—21, Figure 6, giving details of the loading conveyor with a carton shown as completely charged or loaded thereby.

Figure 22 is a horizontal sectional view approximately on the line 22—22 of Figure 21, wherein the loading operation is depicted progressively.

Figure 23 is a front elevation, with parts in section, of a modified form of loading conveyor.

Figure 24 is a plan view thereof, somewhat revolved and looking on a line longitudinal with the machine, showing the bucket conveyor associated therewith similarly as in Figure 22.

Figure 25 is a detailed vertical sectional view of one of the self-righting pusher fingers.

Figure 26 is a longitudinal sectional view on line 26—26, Figure 6, showing rear side elevation of the carton runway and depicting the closing of side flaps, bending of tuck flaps, tucking of tuck flaps, and paddling same home.

Figure 27 is a view similar to Figure 26 but showing a modification employing star wheels for the closing of the side flaps.

Figure 28 is a plan view of the modified form shown in Figure 27.

Figure 29 is a fragmentary view of the runway the same as shown in Figure 26, but showing the first creaser blade operating upon the tuck of the tuck flap of a carton.

Figure 30 is a transverse vertical sectional view on line 30—30, Figure 26, showing the oscillating paddle mechanism for closing the cartons.

Figure 31 is a fragmentary plan view, as seen from the rear side of the machine, showing the disposition of the tuck flap closing mechanism.

Figure 32 is a detailed sectional view on line 32—32, Figure 31, looking in the direction of the arrows.

Figure 33 is a detailed sectional view on the line 33—33, Figure 31, looking in the direction of the arrows.

Figure 34 is a detailed sectional view on line 34—34, Figure 31, looking in the direction of the arrows.

Figure 35 is a detailed sectional view on line 35—35, Figure 31, looking in the direction of the arrows.

Figure 36 is a fragmentary plan view showing the cam, bell-crank lever and connections for the longitudinal movement of the oscillating paddles carriage.

Figure 37 is a sectional view on line 37—37, Figure 6, showing the operating gear for the tuck flap closing paddlers.

Figure 38 is a rear end elevation of the machine.

Figure 39 is a fragmentary elevation, as seen from the rear side of the machine, showing a modified form of oscillating paddle carriage.

Figure 40 is a plan view of the above.

Figure 41 is a perspective view thereof.

Figure 42 is a fragmentary plan view, looking from the rear side of the machine, showing a modified form of paddler.

Figure 43 is an enlarged cross sectional view taken on the line 43—43, Figure 42.

Figure 1:
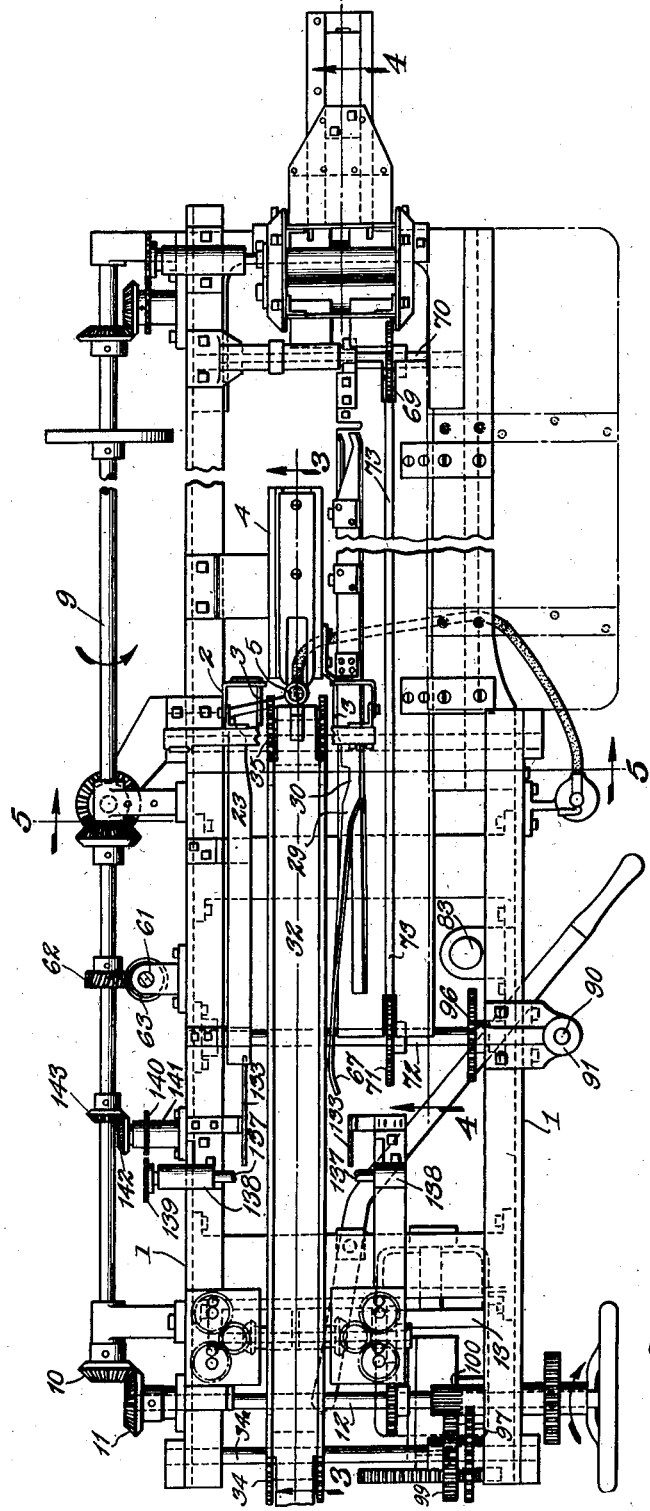
Figure 1 is a top plan view of the carton filling machine, with the endless conveyor mechanism for conveying the commodity in individual capacity for insertion into the cartons omitted from the figure.
Figure 2:
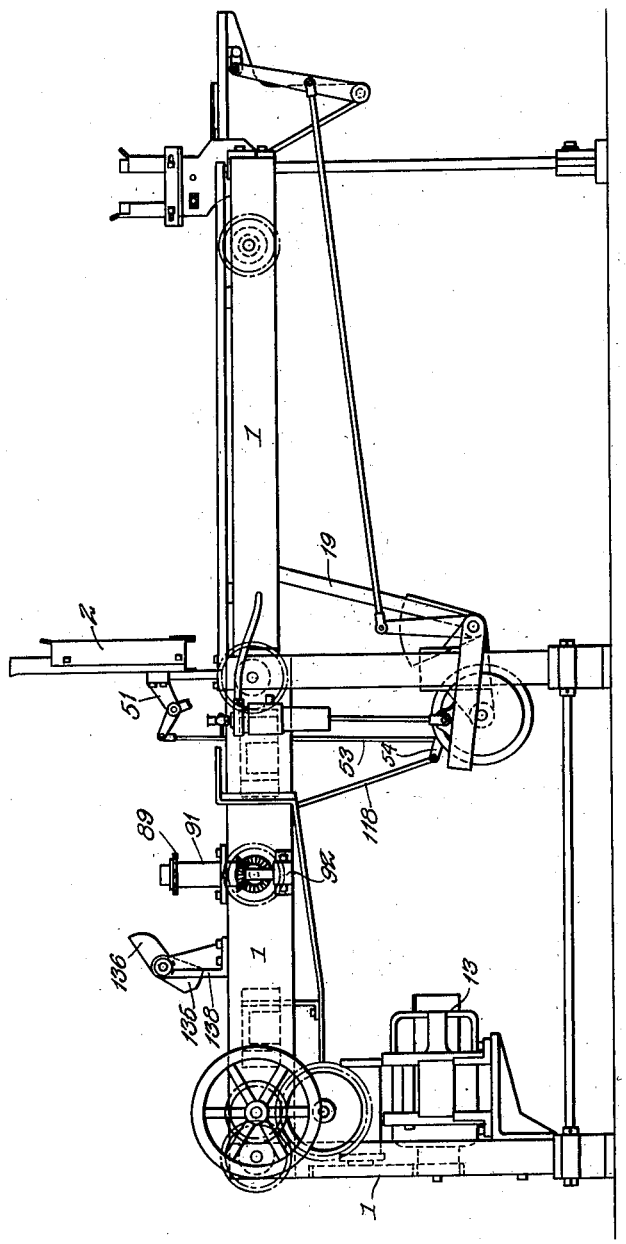
Figure 2 is a side elevation illustrating the front side of the machine and in particular the transmission mechanism.

The machine as illustrated in the accompanying drawings operates upon a carton consisting of a rectangular tubular body portion having end closure flaps. The cartons are supplied to the machine by a magazine in which they are stacked one upon the other in collapsed or flat form and from which they are successively withdrawn or ejected. The lowermost carton of the stack is ejected from the magazine and passed between superposed rails, received by a carrier, and then opened.

The opened carton, as it is conveyed, receives the merchandise to be packed therein, the merchandise being deposited within pockets of a second carrier moving adjacent the carton conveying carrier, and during the continuous movement of the carriers the merchandise is pushed into the open ends of the cartons, whereupon the end closure flaps of the cartons are closed and tucked into position.

Referring to the drawings, 1 indicates the frame of the machine which may be of any preferred design or structure for mounting and supporting the various parts of the machine.

The magazine 2 (see Figures 1 to 9) is mounted upon a cross bar of the machine frame and is built up of sectional angle irons to provide a rectangular skeleton container for a definite dimension of carton in its knock-down or flat condition, the skeleton form providing openings at the front and rear sides for access into the magazine for its full height, facilitating in loading the magazine.

A pair of spaced cross bars 3—3 provide a base upon which the cartons deposited within the magazine are supported or sustained. One of the cross bars (see Figure 6) is shown as fixed to and extended from the lower end of the forward side of the magazine, while the second cross bar is fixed and projects from a stationary horizontal guide plate 4 mounted or secured to the machine frame.

The lower ends of the angle irons forming the rear walls of the magazine are arranged to provide a clearance at the lower end to allow the lowermost carton of the stack to be ejected from the magazine. The lowermost carton, for ejection, is depressed by a suction plunger 5, beneath the magazine, slidably mounted within a bearing bracket 6 secured to the machine frame, the plunger being reciprocated by a bell crank lever 7 pivoted to the machine frame, with the forward end of one arm of the lever having a forked connection with the plunger 5 and the second arm of the lever engaged within a cam groove of a cam 8 fixed upon the shaft 9 suitably journalled in the bearings extending from the rear side of the machine frame.

The shaft 9 extends longitudinally of the machine frame. One end thereof has a bevel gear 10 fixed thereon in mesh with a bevel gear 11 fixed upon the end of a cross shaft 12, the cross shaft 12 being in transmission connection with a motor 13, as shown in Figure 32, supported upon a cross rail of the frame.

The upper end of the plunger is provided with an elastic suction cup 14 for engaging with the lowermost carton in the magazine centrally between the cross rods 3—3 when the plunger is in its upper position. The plunger when engaged against the carton connects thereto by suction to depress or bow the carton in the downward stroke of the plunger 5, drawing the central portion of the lowermost carton away from its next adjacent carton and bringing an edge of the carton into the path of a pair of spaced abutments 15 for ejecting the carton. The abutments engage an edge of the carton at opposite sides of the plunger or suction head, and extend from the lower sides, respectively, of a pair of fingers 17—17 as a forked end of a reciprocating slide plate 16 slidably mounted upon the guide plate 4, the fingers, as shown in Figure 8, with the forward movement of the slide 16, passing between the lowermost carton and the next adjacent superposed carton to sustain the cartons within the magazine while the lowermost carton is being ejected.

The fingers also sustain the cartons at an elevation so that the edge of the carton next in order will be blocked by the lower end of a guard plate 18 adjustably fixed to a cross bar or plate of the magazine. This provides for the ejection of only one carton at a time and enables the cartons to be separated from one another so that there is no opportunity for two cartons to adhere together, as they are sometimes adhesively stuck together in packing. The underside of the carton toward the rear of the machine, under influence of the suction plunger cap 14, comes down upon a chamfer-ended block 14ª over which it slides in a sort of clamped condition when ejected.

The forked slide or ejector 16 is reciprocated by a lever 19 in linked connection with the lower side of the slide 16 and connecting with a pitman 20 actuated by an eccentric 21 fixed upon a cross shaft 22 journalled in bearings of the machine frame. The cross shaft 22 is in transmission connection with the shaft 9. Thus, in a timed relation with the downward movement of the plunger, the ejector 16 is moved forwardly to engage with the depressed lowermost carton and sustain the cartons thereabove within the magazine while the engaged lowermost carton is ejected from the magazine.

As the flat carton is being ejected, the end flaps at the end of the carton and relatively from opposite side walls thereof will be separated, as a tucking flap extending from one side wall of the carton and the folding flap immediately beneath the tucking flap extending from the end of an end wall of the carton immediately beneath the tucking flap in the knock-down or flat position of the carton, as shown in Figure 9, by means of a longitudinal guide rail 23. The tucking flap 24 of the carton 25 rides upon the upper side of the guide rail 23, while the folding flap 26 slides beneath the guard rail. The forward end of the guard rail is suitably shaped and pointed to extend slightly into the magazine to insure tucking flap engagement upon the upper side of the rail 23, while the lower folding flap is sprung downwardly under the pressure brought upon the carton by a stationary presser clip 27 fixed to and extending from the lower end of the magazine.

This separates the flaps sufficiently to insure entry of a separator blade 28 (see Figure 13) reciprocating crosswise of the machine and engaged into the carton for approximately its full length to separate the adjacent sides of the carton and partially open the same, preliminarily conditioning the collapsed carton for the successive operation of opening or squaring.

To insure entry of the separator blade 28, the forward side flap 26 is flexed downwardly by a depressing clip 28ª, provided upon the lower side of the side rail 23 as shown in Figure 12 which causes the lower side of the box to drop sufficiently to permit entry of the forward end of the blade 28.

A second rail or guide 29 extending longitudinally of the machine is provided for the flaps at the opposite ends of the carton and in the present instance, the loading end of the carton. This rail at its receiving end is notched as at 30 (see Figures 6, 14, 16 and 18), the notch serving to separate the upper tucking flap from the lower folding flap in the flat condition of the carton after the carton has been completely ejected from the magazine, the tucking flap riding upon the rail while the folding flap slides beneath the rail. The rail is bent from a plane in the horizontal to the vertical to elevate and bend the tucking flap upwardly and rearwardly out of reach of the mechanism for loading the carton.

The ejector in ejecting the flat carton moves the same from the magazine a distance sufficient so that it can be completely deposited into a pocket space of an endless carrier within which the carton is opened. The carton also, as it is ejected from the magazine, is passed between a set of superposed parallel rails consisting of a pair of upper rails 31—31 and a lower plate rail 32, and between which the carton is compressively confined until filled and the flaps are closed and ready for delivery from the machine. The upper and lower rails are definitely spaced apart proportionally to the cross sectional dimension of the carton when fully opened and squared and slightly scant thereto for impinging the carton between the rails to hold the same in its open position while it is being conveyed and filled.

In the process of opening the carton, it is forced or impinged between the rails so that the side walls are slightly inclined rearwardly against the folding spring or tension of the walls of the carton, stressing toward collapse of the carton. In such cramped condition, the carton is sustained in an open position, free to be slid forwardly between the rails and conveyed by the conveyor engaging only one side of the carton. The carton, therefore, is seated and deposited within a carrier pocket in its collapsed or flat condition and opened within the pocket space before it is engaged and moved by the carrier.

This materially facilitates in loading the carton within the carrier without injury to the carton or relying upon the carrier to hold the carton in its open position, and also permits shifting of the carton within the carrier space, automatically adjusting itself after being engaged by the carrier. This avoids delicacy of relative timing between the various parts, as has been experienced in machines of this class in which an opened carton was deposited within correspondingly dimensioned pockets of the carrier.

This feature is highly advantageous for running the machine at high speed with a continuously moving carrier, and provides simplicity in structure and operation. The action on the cartons, which is intermittent while ejecting cartons, is continuous after once taken up by the carrier.

The carrier comprises a pair of sprocket chains 33—33 suitably spaced apart and located beneath the lower plate rail 32 (see Figures 3 and 38) moving longitudinally along the opposite edges of the plate rail. Each chain is respectively engaged over a driving sprocket wheel 34 fixed upon the cross shaft 34ª at the rear end of the machine and upon the sprocket wheel 35 upon a shaft 36 at the forward end of the machine approximately below the magazine.

The upper or forward moving runs of the chains between the driver and idler sprocket wheels slide upon a track 37 (see Figure 3) fixed upon a supporting plate 38 below the plate rail 32 and mounted upon the cross beams of the machine frame. The chains, each at intervals, are provided with teeth 39 definitely spaced apart, the spacing between the teeth serving as pockets to receive the cartons to be engaged by the teeth for conveying the same. The teeth of both chains are arranged in aligned sets, adapting a tooth of each chain to engage with the carton at relatively opposite sides or ends of the plate rail and extend upwardly or of a height approximately equal to the spacing between the upper and lower rails between which the cartons are slid.

The carrier motion is continuous and at a rate relating to the intermittent ejection of the cartons from the magazine, so that a carton is ejected from the magazine over the carrier to be received by a set of aligned teeth of the carrier as they move upon the rails 37 for conveying the carton through the machine. The driving sprocket wheels are located in proximity to the base of the magazine so that a set of teeth, next in order to engage with an ejected carton, are moving in an arc about the sprocket wheel during the interval of carton ejection and thereby out of the way of the carton as it is being ejected from the magazine so as not to interfere or obstruct free movement of the carton. This facilitates in passing the carton between two successive sets of teeth or into the pocket spacing formed thereby, and also enables the folded carton to be opened before it is taken up by the carrier which is continuous in its operation.

After a full delivery of the folded carton by the ejector, it is appropriately positioned to receive a separator blade for initially separating the overlying walls of the carton. Before entry of the blade, a tuck flap clamp, which is described further on, operates to secure the carton against longitudinal movement. The blade on being pushed into the carton moves along a fold or score line of the carton and presents an edge over which a side wall of the carton can be bent or swung in opening the carton.

As soon as the separator blade has moved into the carton for its full length, the carton is partially opened by a swinging arm 40 mounted above the upper rails 31 and operating in conjunction with a reciprocating plunger 41 engaging the opposite side or edge of the flat carton, moving in a direction counter to the swinging arm. The carton is opened in advance of being engaged by a set of carrier teeth, adapting the opened carton to be pushed against the forward edge of a set of teeth of the carrier, as shown in Figure 17. The forward edge of the teeth are slightly inclined corresponding to the inclination the side walls of the carton assume when the carton is opened and impinged between the rails.

The separator blade (see Figure 10, sheet 5) is slidably mounted within a slideway of a horizontal support 42 of the machine frame and pivotally connects to a link 43 attached to an end of a lever 44 fulcrumed upon a post 45 extending upwardly from the machine frame (see Figure 5). The lever is actuated by a link 46 pivotally connected to the lever and to a second lever 47 fulcrumed upon the machine frame and engaged with a cam wheel 48 fixed upon the shaft 9.

Figure 3:
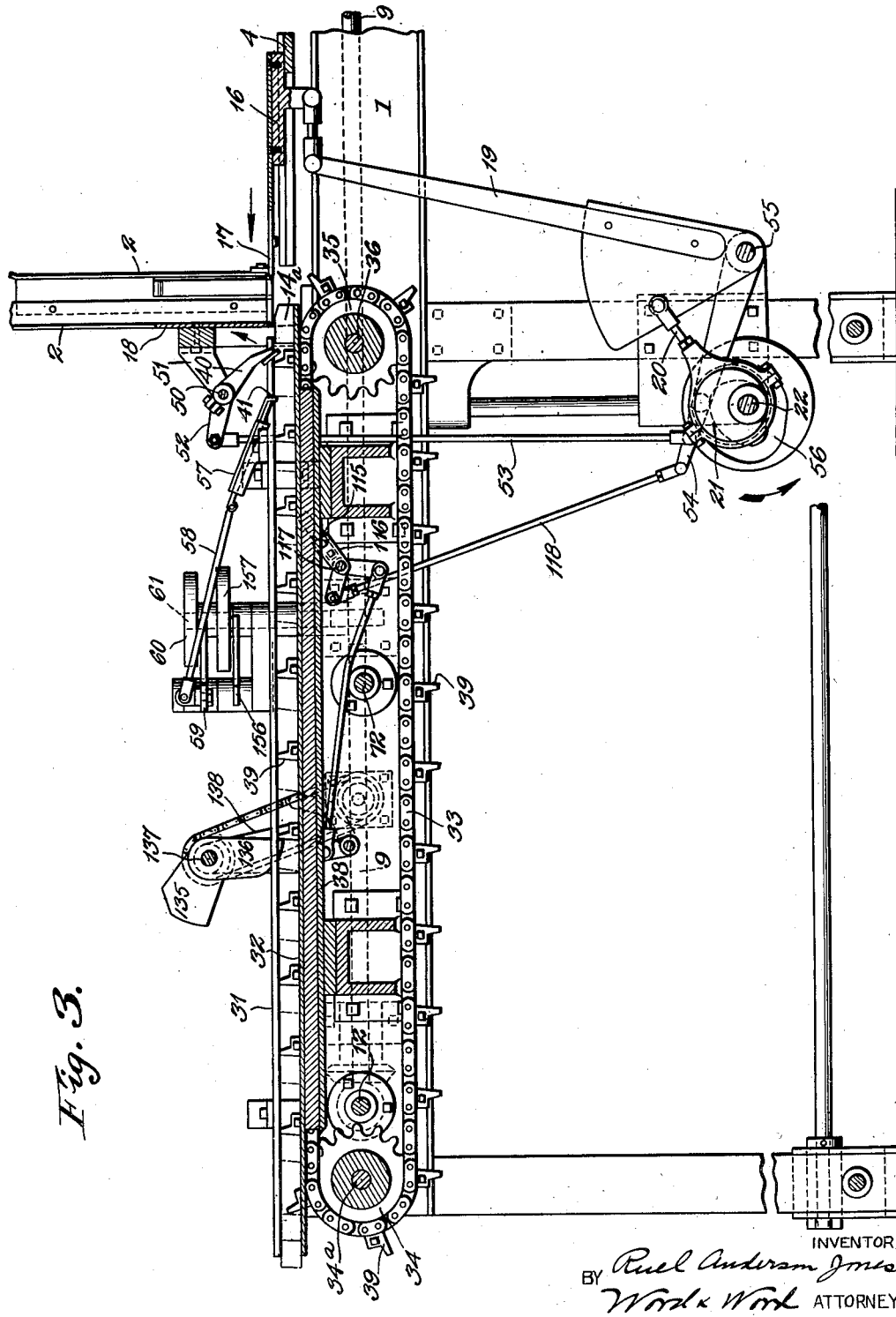
Figure 3 is an enlarged section on line 3—3, Figure 1.

The swinging arm 40 is fixed upon a rock shaft 50 journalled in bearings 51—51 fixed to the rear side of the magazine (see Figures 3 and 5). One end of the rock shaft carries a crank arm 52 pivotally connecting with a link 53 extending downwardly toward the base of the machine frame. The link 53 pivotally connects to a lever 54 fulcrumed upon a cross rod 55 supported upon the machine frame, the cross rod also serving as a fulcrum for the lever 19 for actuating the ejector. The lever 54 engages with a cam groove of a cam wheel 56 fixed upon the shaft 22.

The reciprocating plunger 41 (see Figures 3, 17 and 20) is mounted within a slideway of a bracket 57 supported upon the upper rails 31, the plunger operating between said rails and reciprocating at an angle to move upwardly in its retreat stroke away and out of reach of the conveyed carton. A link 58 at one end pivotally connects with the plunger 41 and at its opposite end with an arm of a lever 59. The lever 59 engages with a cam 60 fixed to a vertical shaft 61 in driven connection with the horizontal shaft 9 by means of spiral gears 62, 63, respectively (see Figure 6) fixed to the shafts 9 and 61.

The forward end of the plunger 41 is shouldered for engagement in the forward stroke of the plunger with the side wall of the carton, preliminarily engaging the carton when in a partially opened condition at the corner or juncture of the face and side walls, as illustrated in Figure 15, moving the carton toward and in opposition to the arm 40 and against a set of teeth 39 of the carrier as they reach a position to become effective in conveying the carton. The teeth immediately retreat so as not to interfere or arrest the advance of the carton when engaged by the teeth of the carrier. (See Figure 11 wherein a carton is shown passing under the plunger 41.)

Before the spreader blade 28 enters the folded or flat carton to partially open the same, the carton is clamped against longitudinal motion so that it cannot move under the force of the spreader blade. The carton during the period of the operation of the spreader blade is at rest with the folding flap 24 at one end of the carton resting upon the rail 23. The flap is clamped against the rail (see Figures 13 and 14) by a jaw 64 formed upon the end of an arm of a bell crank lever 65 pivoted upon the frame of the machine and actuated by a cam wheel 66 fixed on the longitudinal shaft 9.

As the carton is being conveyed by the conveyor, the tucking flap at the loading side or end of the carton is raised or swung upwardly out of position, it being understood that the closing flaps at the opposite ends of the side walls of the carton are contiguous with their side walls when the carton is opened, similarly as in the knock-down position of the carton, but below the guide rails 23, 29. This follows for the folding flaps at both ends of the carton.

When the carton is open, the folding flaps occupy an outflung and vertical position below the guide rails 23, 29 and therefore are not obstructive to loading the carton.

The guide rail 29 as shown in Figure 6 from the point of station at which the carton is opened, curves or bends as at 67 from the horizontal plane to a vertical position for bending a tucking flap 24 at the loading end of the carton upwardly and rearwardly as it is being conveyed to hold the flap open while loading and to be out of the path of the merchandise conveyor. The merchandise conveyor moves alongside the carton conveyor synchronously adapting the merchandise carried thereby preferably in spaced pockets corresponding to the spacing of the cartons in the carton conveyor for alignment with the open ends of the pockets and for pushing the merchandise progressively into the cartons with the continuous motion of the conveyors.

The merchandise conveyor (see Figure 4) comprises an endless sprocket chain 68 about an idler sprocket wheel 69 fixed upon a cross shaft 70 suitably journalled in bearings in the machine frame at the fore end thereof and about a driving sprocket wheel 71 fixed upon a cross shaft 72 suitably journalled with bearings in the machine frame below the loading mechanism. The sprocket chain in its forward run rides over a tract 73 to maintain the horizontal alignment of the chain and sustain the moving pockets at an elevation relative to the cartons enabling the merchandise to be pushed into the carton endwise.

The sprocket chain 68 is provided with a plurality of equally spaced open ended pockets 74, and the particular form of pocket shown is of drawn form U-shaped in cross section with flaring outer ends primarily adaptable for holding compressible tube containers as merchandise to be packed into the cartons.

The pockets each are fixed to an angle support 75 which is secured to the sprocket chain and provides a pocket space 76 below the merchandise loading pocket for the reception of a folded circular to be inserted into the carton with the merchandise as shown in Figure 19.

The mechanism for folding the circulars and appropriately inserting the same within the circular loading pocket or space is positioned at the fore end of the machine beyond the carton magazine. The circular folding and dispensing mechanism wheel representing an adjunct to the machine may be treated as separate and apart from the present invention, therefore, is not disclosed nor described in detail nor is its embodiment essential and is only referred to herein to disclose the characteristics of the machine for extended utility of the machine insofar as it relates to loading the merchandise into a carton operates in the same manner irrespective if other circular is included or not.

Holders or trays of various design and dimension most adaptable to the class of merchandise handled may be employed without change to the carton handling and loading mechanism.

In the present embodiment the merchandise is manually placed into the pockets or trays as an operator can conveniently supply all of the pockets as they move in the forward run of the conveyor chain, the chain being of extended length to accommodate for an excess number of pockets moving idly in advance of reaching the point where the loading mechanism comes into action therewith.

The merchandise is pushed or conveyed into the carton by continuously moving fingers 77 dependingly supported from an endless chain 78 located at an elevation above the conveyor mechanism and at one end thereof (see Figures 6, 21 and 22) and moves transversely or at an angle to the merchandise conveyor to intersect the pockets.

The sprocket chain is provided with a plurality of push fingers 77 suitably spaced apart and bearing a relation to the spacing of the merchandise holding pockets or trays so that each finger in its progress intersects a pocket centrally and coordinately moves in a corresponding direction therewith while traversing the pocket longitudinally. Thus as it enters the pocket it contacts with the merchandise therein and conveys the same laterally to the forward travel of the merchandise with the merchandise conveyor and thereby pushes into the open end of a carton aligned and moving in registry with the pocket.

As the pocket approaches the return bend of the chain, the finger has reached the end of its intersecting travel through the pocket and therefore as the pocket recedes or moves downwardly in an arc over the sprocket wheel, both finger and pocket move in parting directions away from one another.

The endless sprocket chain 78 is engaged about an idler sprocket wheel 79 journalled upon a stud 80 fixed to and depending from a horizontal supporting plate 81. The supporting plate 81 is fixed upon a bracket 82 vertically adjustable upon a vertical post 83 fixed to and extending upwardly from the machine frame.

The sprocket chain is also engaged about a driven sprocket wheel 84 in the same plane with sprocket wheel 79 likewise journalled upon a stud 85 fixed to and depending from the supporting plate 81. The loading conveyor, therefore, is readily adjusted vertically for changing its elevation to raise or lower the fingers relatively to the elevation of the pockets or trays of the merchandise conveyor.

The hub 86 of the driven sprocket wheel 84 has a driving sprocket wheel 87 fixed thereto (see Figures 6 and 21) engaged with an endless sprocket chain 88. The sprocket chain 88 is also engaged about a second sprocket 89 fixed upon a vertical shaft 90 journalled in the brackets 91, 92, fixed to and extending from the side frame of the machine. The vertical shaft 90 carries the bevel gear 93 in mesh with bevel gear 94 fixed on the end of a cross shaft 72. The cross shaft 72 is driven by sprocket chain 95 and engaged about a sprocket wheel 96 fixed on said cross shaft 72 and about a sprocket wheel 97 fixed upon a cross shaft 34ª journalled in bearings mounted in the machine frame.

The cross shaft 34ª carries a gear 99 in mesh with a pinion 100 fixed on the cross shaft 12 (see Figure 1). In Figures 23, 24 and 25, sheet 12, a modification of loading mechanism is shown in which gear transmission is employed in place of the chain transmission and the loading fingers are mounted to swivel and provided with heads at their lower ends furnishing increased merchandise contacting surfaces and in which the contacting surface is maintained in a plane with the contacting end of the merchandise in the pockets or tray to insure a more stabilized movement of the merchandise as it is being pushed or dispatched into the carton.

A broad side surface of the finger more substantially engages or contacts with the merchandise and will not impart any canting strains thereto which would be apt to shift the merchandise or angularly direct the same as it is being pushed through the pocket which would throw it out of line with the open end of the carton.

While the cylindrical type of finger operates sufficiently for some types of merchandise, it will be recognized that it has been in line contact with the end thereof and its curved surface is more susceptible to exerting canting influence to the merchandise in the pocket and particularly if any resistance is encountered as the carton initially enters the pocket as when a folded circular is included which folds over the end of the merchandise so that the merchandise can be readily deflected and be jammed against the edge of the carton or otherwise interfere with the operation of the machine.

The loading conveyor in the modified form has its sprocket wheels journalled upon studs 80, 85 fixed to and extending upwardly from the upper side of the horizontal supporting plate 81. The driving sprocket wheel 84 is driven by a gear 101 fixed to the hub of the sprocket wheel and in mesh with an intermediate gear 102 journalled upon a stud fixed to the supporting plate 81 and the intermediate gear 102 in turn is in mesh with the gear 103 fixed upon the upper end of a vertical shaft 104 journalled in a bearing extending from the bracket 82 and the lower end of the vertical shaft 104 carries a spiral gear 105 in mesh with a spiral gear 106 fixed on the cross shaft 72.

The fingers are mounted to swivel upon the conveyor rail and engage with a stationary track so that the head is swung on the tank in an appropriate position as presenting its surface parallel to the line of motion of the merchandise conveyor for the full period that the finger passes through the pocket or tray.

As shown in Figure 25, each finger constitutes a stem 107 having a head 108 fixed to its lower end extending through a sleeve 109 which also serves as a stud for joining the connecting links of the sprocket chain and a spacer for the opposite set of links of the chain. A collar or cylindrical roller 110 engages concentrically loosely about the sleeve 109 as an element of the roller sprocket chain. A crank 111 is fixed to the upper end of the stem 107, this crank end being provided with a roller engaging into an endless guide or tracker groove 112 formed into the underside of the tracker plate 113 fixed to the bracket 83 in a superposed relation to the supporting plate 81.

The outline of the tracker groove may prescribe any form of path most suitable for definitely swinging or setting the position of the head best suited for uniformly moving the merchandise through the pocket and into the carton and also to maintain its line of motion so that the merchandise will always be centered with the opening end of the carton. It also provides means for stabilizing the head for its entire period of contact with the merchandise and maintains its position as long as it remains in contact with the merchandise and also when it moves laterally to the merchandise at the end of its merchandise dispatching action when it departs therefrom in moving in an arc about the sprocket wheel.

The tracker groove at the end of its effectiveness upon the merchandise can be arranged to slightly swivel or swing the head if necessary to give an impulsive stroke to the merchandise.

With the advancing of the carton, and before it reaches the point at which the merchandise enters the carton, the folding flaps 26 at the aft end of the carton are initially closed and slide against a stop rail 114 to prevent dispatching the merchandise to the opposite end of the carton or in longitudinally displacing or moving the carton as the merchandise is being inserted particularly of any friction imposed upon the carton by the moving merchandise which is encountered when the merchandise carries a folded circular thereabout.

The closing flaps 26 when closed overlap one another and close in relatively opposite directions, therefore, one is moved slightly in advance of the second to effect the overlap. The folding flap contiguous with the rear side wall of the carton is closed by an oscillating finger 115 fixed to and extending upwardly from a lever 116 (see Figures 3 and 26) fixed upon a shaft 117 journalled in the side frames of the machine. The lever 116 pivotally connects with a connecting rod 118 extending downwardly and connecting with the lever arm 54 actuated by the cam 56.

As the finger 115 is swung forwardly it will strike the outer side of the flap 26 extending from the rear side wall of the carton, swinging or folding the flap inwardly and immediately following the closing of the flap by the finger 115, the carton in its advance engages the opposite flap against the curved or flared forward end of the stop rail 114 as a stationary folder whereupon the finger recedes to its normal position for a subsequent operation upon a flap of a successive carton. As the carton advances, the flaps are forced inwardly and held closed by the stop rail 114 which also serves as an abutment for the carton to prevent its longitudinal displacement while the merchandise is being pushed therein.

After the merchandise has been inserted into the carton the tucking flaps 24 at both ends of the carton are released by their respective guide rails 23, 29, the guide rail 23 terminating at such point, and the end of guide rail 29 is curved outwardly as shown in Figure 6 to allow the tucking flap to recede. The tucking flap at the loading end of the carton when released by the guide rail swings downwardly under its own tension whereupon both tucking flaps are in positions to be simultaneously operated upon for closing and tucking the same into the ends of the carton.

Immediately after the merchandise has been fully inserted or pushed into the carton, the folding flaps at the loading end are closed or turned in in substantially the same manner as previously described for the closing flaps at the opposite or rear ends of the carton. The closing flaps at the loading end likewise close overlappingly, necessitating that one be closed in advance of the other. Therefore, one flap is operated upon by a swinging finger 120 fixed upon a rock shaft 121 mounted below the merchandise conveyor, the finger swinging upwardly to wipe across the folding flap, swinging the same inwardly to its closure position, the second closing flap successively being closed or swung inwardly by engaging against a stationary inclined folder 122, (see Figure 6), the folder forcing the flap inwardly under the advancing motion of the carton.

The rock shaft 121 is actuated by a crank arm 123 fixed to the shaft and pivotally connecting with a connecting rod 124, the connecting rod connecting with a crank arm 125 as an element of the crank lever 116. In Figures 27 and 28 a modified form of flap closing means is illustrated representing a rotative type of finger instead of oscillatory as previously described. The fingers in plural number are arranged in star wheel formation, a similar star wheel being provided for each of the opposite ends of the carton, both of duplicate construction and similarly transmitted and connecting with a common driving shaft.

As it is desirable to close the folding flaps at the rear end of the carton in advance of the loading end, the star wheels like the swinging fingers are arranged in relatively fore and aft positions. Each star wheel 124$^a$ provides four fingers equally spaced apart about the axis of the wheel and of corresponding shape, each having a straight edge 125$^a$ parallel with a diametric line of the wheel. The wheel is journalled upon a stud 126 mounted in a bearing bracket 127 fixed to the machine frame, the wheel transmittingly connecting or fixed to a gear 128 in mesh with an intermediate gear 129 loosely journalled upon a stud mounted in said bearing bracket. The intermediate gearing in turn is in mesh with a gear 131 fixed upon a cross shaft 72 which also forms the transmitting shaft for the merchandise conveyor.

The rotation of the star wheel is timed so that the teeth or fingers thereof in their successive order each wipe across the folding flap of a carton to turn the same inward with the continuous movement of the carton as they successively travel into cooperative relation with the star wheel. The star wheel, while moving in the same direction with the advancing or moving carton, travels at a slightly increased rate thereover so that it moves out of way from the second flap which is forced inwardly by the stationary folder. Before the second flap is fully closed, the finger of the star wheel gradually retreats from the flap so that it holds the flap closed practically until the second flap is brought into overlapping bearing contact with the first.

The closing of the tucking flaps at the opposite ends of the carton is simultaneously performed and with mechanism of duplicate construction. Therefore, a detailed description of the mechanism will be in the singular. The tucking flaps with the advance of the carton are brought upon stationary creaser blades and struck by a pair of rotative creaser blades arranged at relatively opposite sides of the stationary creaser blades for successively creasing the tucking flap along two lines to preliminarily partially fold and bend the tucking flap so that the tucking end of the flap can be swung downward and pushed into the carton, and when the flap has been closed and its end tucked into the carton, the opposite ends of the carton are simultaneously engaged by paddler devices compressibly engaging the carton from opposite ends.

The tucking flap as it leaves its guide rail slides upon a stationary creaser blade 133 set in a perpendicular position and extending longitudinally with the feed of the carton and supported by brackets 134 fixed to the machine frame. A pair of rotary creaser blades 135, 136, laterally spaced apart, are fixed to a cross shaft 137 above the carton conveyor and journalled in bearing brackets 138 fixed to the upper side of the machine frame.

The cross shaft 137 (see Figures 1 and 6) at one end carries a driven sprocket 139 connected by a chain 139$^a$ with a driving sprocket 140 upon a stud shaft journalled in a bearing bracket 141 extending laterally from the machine frame 1. The stud shaft is provided with a bevelled gear 142 in mesh with a bevelled gear 143 fixed on the shaft 9. The rotary creaser blade 135 is set in advance of the second rotary creaser blade 136 so that they successively operate upon the tucking flap and at different positions thereof in each cycle of the rotary blades.

The rotary blade 135 moves alongside of the outside face of the stationary creaser blade 133 for bending the tucking portion "a" of the tucking flap downwardly along a score line dividing the tucking portion from the body portion "b", which body portion provides the enclosure of the carton.

After the first flap creasing and bending operation, the second rotary creaser blade follows in its order to bend the flap over a second stationary creaser blade 119 formed on the aft end of the stop rail 114 on the rear side of the machine and another second stationary creaser blade 122 toward the front side of the machine, each having a chamfered upper edge and disposed at a lower elevation than the creasing edge of the first creaser blade 133 (see Figure 29). The second stationary creaser blades have their inner edges approximately in line with the line of fold dividing the tucking flap from the end of the carton wall with which the flap is contiguous.

The second rotary blade 136 in its cycle strikes or wipes across the tucking flap for bending the flap downwardly and at an angle to the tucking portion "a" to condition the flap for moving the same to its closed position with the tucking portion engaged into the carton. Both of the rotary creaser blades are shaped at their outer ends for obtaining the best bending results without injury to the flap. For instance, the rotary blade 135 has a tangential edge portion 145 followed by an arc portion 136ª, the tangential edge portion imparting a striking action upon the flap, while the arc portion imparts a wiping action thereupon and longitudinally of the stationary blade with which it cooperates, bending the flap between the stationary and rotary blades.

The second rotary creaser blade has a curved edge in an arc eccentric to the rotative axis of the blade for imparting a wiping action upon the flap and over the stationary blades 119 and 122. The movable creaser blades rotate continuously and at a rate which will permit each blade in a cycle to cooperate with the tucking flap of a carton moving or advancing continuously. The cartons are therefore successively operated upon for creasing and bending the tucking flaps as the cartons in their travel move by the creasing blades.

As the carton leaves the position or station at which its tucking flap is creased, a tucking flap moves within a curved trough 146 to be engaged by an oscillating wing or flapper 147 swinging downwardly and inwardly within the trough for pushing the tucking portion of the flap into the carton and closing the flap. As the carton moves into cooperative relation with the trough, the flap is engaged by a stationary angular guide 148 formed within the trough for moving and holding the flap downwardly to an appropriate degree so that it can be engaged by the oscillating wing 147 in its forward or downward action to move the tucking flap home.

The flapper has a compound action swinging downwardly and inwardly toward the carton and reciprocating in a direction longitudinal with the advance of the carton. It engages the tucking flap toward the fore end with respect to the direction of carton travel and before the tucking flap moves clear of the stationary guide 148. Therefore, its action tends to slightly cant the tucking flap so that its tucking portion enters the carton at an angle facilitating its entry.

The trough as shown in Figures 27 to 35 terminate slightly above the plane of the lower wall of the carton so that the tucking portion of the flap cannot encounter the edge of the wall or pass outside below the wall in its closing motion. As the tucking flaps for the opposite ends of the carton are operated upon simultaneously, the flappers moving in relatively opposing directions toward the body of the carton, there is no opportunity for the carton to shift within the conveyor under any pressure imparted thereto while the tucking flap is being pushed to its closure position.

The flapper is secured upon the end of the rocker rod 149 journalled within bearings extending from a slide block 150 dove-tailed upon a stationary slide 151 fixed upon the rails 31—31. The rocker rod 149 at one or rear end is provided with a crank arm 152 carrying a roller 153 riding upon a stationary incline or cam 154 for rocking the rod with the reciprocation of the slide block. As the slide block moves forwardly in the direction correspondingly with the direction of carton travel, the crank arm is moved upon the incline, swivelling the rod 149 thereby swinging the flapper inward, the flapper moving with the slide in its forward reciprocating stroke thereby correspondingly moving with the carton as well as swinging laterally with respect to the carton motion.

The slide block 150 pivotally connects to a connecting rod 155 which in turn is connected with an arm of a bell crank lever 156 pivoted upon a vertical supporting rod which likewise sustains the bell crank lever 59 for the carton squaring plunger 41. The bell crank lever 156 has its second arm engaged into a cam groove of a cam wheel 157 fixed on the vertical shaft 61 below the cam 60 (see Figures 3, 6 and 36).

Each of the rocker rods 149 for the flap closing flappers at the opposite ends of the carton is provided with a radially extended pin 158, the pins being connected by a spring 159 (see Figure 30) for yieldingly maintaining the crank arms of the rocker rods in contact for engagement with their respective stationary inclines and the cam 154.

In Figures 39, 40, and 41, sheet 17, a modified form of flapper actuating mechanism is disclosed in which the rocker rods 149 are provided with a cam head 160 fixed to the end of the rod, substituted for the crank arm 152 previously referred to, and provided with a spiral groove or slot 162 into which a roller 163 carried by a stationary stud 164 is engaged and fixed. The stud is dependingly secured from a cross head 165 adjustably secured on the stationary guide block 151. The cam heads with the reciprocation of the slide block 150 rock or swivel the rods imparting the same motion as previously described for the stationary inclines excepting that the action is positive in reversing directions and eliminates the use of the spring 159.

After the tucking flaps have been closed in by the flappers, the carton is advanced moving between continuously moving paddlers having compound motion for compressibly engaging the carton therebetween and against its opposite ends and during the continuous movement or travel of the carton with the conveyor, the paddlers in their compressive motion moving coordinately with the carton. The carton contacting faces of the paddlers therefore move transversely to and longitudinally with the continually travelling carton and are constantly maintained in parallelism with the line of carton travel so that the compression is uniformly against the entire end area of the carton, the carton continuing at such point to be confined against vertical displacement between the upper and lower tracking rails 31, 32.

The paddlers for the opposite ends of the carton are of duplicate construction operating simultaneously on the relative opposite ends of the carton and relatively opposingly for compressibly engaging the carton therebetween and coordinately in directions longitudinal to the travel of the carton. Therefore, the detailed description will be confined to the singular.

164ª indicates an angle plate providing a vertical flange 165ª for engagement against an end of the carton. The plate 164ª is in parallel rod connection with a pair of crank pins 166—166 respectively fixed to a pair of gears 167, 168 (see Figure 6) journalled upon a bracket support 169 fixed to the machine frame. The gears 167, 168 are in mesh with a common transmitting gear 170 fixed upon the end of a vertical shaft 171 journalled in a bearing carried by said support 169 (see Figure 37). The opposite end of the shaft 171 is provided with a bevelled gear 172 in mesh with a bevelled gear 173 fixed upon a cross shaft 174 journalled in a bearing bracket 175 fixed to a cross beam of the machine frame. The cross shaft 174 at one end is provided with a gear 176 in mesh with a gear 177 on the cross shaft 12. The cross shaft 174 likewise transmittingly connects with the gearing of the second paddler at an opposite side of the track rails 31, 32.

In the modified forms of paddlers shown in Figures 39, 40, 42 and 43 the crank gears 167 and 168 are positioned to bring a diametric line through the axis of the gears laterally to the line of carton travel instead of longitudinally parallel thereto as for the type previously described with the effect and operation of the paddlers the same. Each paddler, however, operates upon two cartons in its active stroke as upon a foremost carton substantially as previously described for compacting the tucking flap within the end of the carton, and upon a next succeeding carton to engage into the carton between the tucking portion of the flap and the lower wall of the carton. This action or operation is primarily to correct any irregularities to the tucking flap which may occur through an ineffective closure by the flapper.

The modified paddler shown in Figures 42 and 43 is provided with a tongue 178 forward of the vertical flange 165ª for a forward stroke of the paddler which moves into the carton between the tucking flap and adjacent wall of the carton and below the stationary guide 180. This smoothes out the flap and properly positions the same within the carton whereupon as the carton advances it is engaged by the vertical flange of the flapper to compact the same. The paddler represents the final operation upon the carton whereupon it is advanced by the conveyor upon a discharge at the end of the conveyor.

Having described my invention, I claim:

1. In a carton loading machine, continuous moving means for impelling open end cartons in spaced relation successively, continuous moving means for conveying mechandise in endwise relation to the cartons for packing into the carton, an endless chain having a plurality of spaced fingers traversing with said chain, concurrently with and at an angle to said mechandise conveying means, each finger in an order, engaging a respective piece of merchandise moving the same from the merchandise conveying means into the carton while the parts continue in motion in an advancing direction, and a stationary track cooperating with said fingers for respectively swinging the same and maintain its head end in a position approximately relative to the end of the merchandise with which it engages in moving the same into the carton.

2. In a carton loading machine, continuous moving means for impelling open end cartons in spaced relation successively, superposed rails between which the cartons are impelled confiningly sustaining the cartons against collapse, continuous moving means for conveying merchandise in endwise relation to the cartons for packing into the carton, continuous moving means for engaging the merchandise and transferring the same from the merchandise conveying means into the carton while the parts continue in motion in an advancing direction, said last mentioned means comprising an endless chain having its forward run moving in a direction obliquely to the line of travel of the merchandise, fingers extending from said chain definitely spaced apart each for engaging with an end of a piece of merchandise for moving the same into the container, each finger provided with a head for engaging the end of the piece of merchandise, and a stationary track cooperating with said fingers for swinging the same and maintain its head end in a position appropriately relative to the end of the merchandise with which it engages in moving the same into the carton.

3. In a carton loading machine, an endless conveyor having teeth extending therefrom for impelling cartons to be deposited successively in the spacing between the teeth, a second endless conveyor travelling in parallelism with said first conveyor having relatively spaced open ended pockets and adapted to move in alignment respectively to the cartons impelled by said first conveyor, a third endless conveyor moving obliquely to the direction of travel of said second conveyor having elements extended therefrom for respectively passing through said pockets and transfer the merchandise from a pocket into a carton while all the conveyors maintain their continuous movement, said last mentioned means comprising an endless chain having its forward run moving in a direction obliquely to the line of travel of the merchandise, fingers extending from said chain definitely spaced apart each for engaging with an end of a piece of merchandise for moving the same into the container, each finger provided with a head for engaging the end of the piece of merchandise, and a stationary track cooperating with said fingers for swinging the same and maintain its head end in a position appropriately relative to the end of the merchandise with which it engages in moving the same into the carton.

4. In a carton loading machine, a conveyor having teeth extending therefrom for impelling cartons to be deposited successively in the spacing between the teeth, superposed rails longitudinal of said conveyor for sustaining the cartons in open position therebetween, a second conveyor travelling in parallelism with said first conveyor having relatively spaced open ended pockets moving in alignment respectively with the cartons impelled by said first conveyor, a third conveyor moving obliquely to the direction of travel of said second conveyor having elements extended therefrom for respectively passing through said pockets and transfer the merchandise from a pocket into a carton while all the conveyors maintain their continuous movement, said last mentioned means comprising an endless chain having its forward run moving in a direction obliquely to the line of travel of the merchandise, fingers extending from said chain definitely spaced apart each for engaging with an end of a piece of mechandise for moving the same into the container, each finger provided with a head for engaging the end of the piece of mercandise, and a stationary track cooperating with said fingers for swinging the same and maintain its head end in a position appropriately relative to the end of the merchandise with which it engages in moving the same into the carton.

5. In a carton loading machine, a magazine for holding the stack of collapsed cartons, each carton provided with flaps extending from relative opposite ends of a wall thereof and in plane therewith, means for ejecting the cartons successively from the magazine, supports on which the flaps bear sustaining the collapsed ejected cartons, means operating against opposite edges of an ejected collapsed carton to open the same, and a continuously moving carrier having pockets each adapted to receive a carton and providing a shouldered engagement with the carton when opened for impelling the same.

6. In a carton loading machine, a magazine for holding a stack of collapsed cartons, an ejector for successively ejecting the cartons each when lowermost of the stack, the carton having flaps extending from opposite ends of a body wall thereof and in plane therewith serving as wings for freely suspending the collapsed body of the carton, stationary supports for said flaps, and means for successively engaging the collapsed body to open the same.

7. In a carton loading machine, a combination of supporting means for sustaining a collapsed carton by its flaps extending from opposite ends of the carton, a blade operative to enter the collapsed carton to initially open the same, and means operative upon the partially opened carton to complete the opening thereof while the carton remains sustained through its flaps on said supporting means.

8. In a carton loading machine, a combination of supporting means for clampingly sustaining a collapsed carton by its flaps extending from opposite ends of the carton, a blade operative to enter the collapsed carton to initially open the same, and means operative upon the partially opened carton to complete the opening thereof while the carton remains sustained through its flaps on said supporting means.

9. In a carton loading machine, a combination of supporting means for sustaining a collapsed carton by its flaps extending from opposite ends of the carton, a blade operative to enter the collapsed carton to initially open the same, and means to compressibly engage the body of the carton between the flaps to complete the opening thereof while the carton remains sustained through its flaps on said suporting means.

10. In a carton loading machine, a combination of supporting means for sustaining a collapsed carton by its flaps extending from opposite ends of the carton, a blade operative to enter the collapsed carton below the sustained flaps to initially open the same, means operative upon the partially opened carton to complete the opening thereof while the carton remains sustained through its flaps on said supporting means, and superposed rails between which the carton is opened and compressibly confined against collapse when fully opened.

11. In a carton loading machine, a combination of supporting means for sustaining a collapsed carton by its flaps extending from opposite ends of the carton, a blade operative to enter the collapsed carton to initially open the same, means operative upon the partially opened carton to complete the opening thereof while the carton remains sustained through its flaps on said supporting means, and means for impelling cartons and merchandise to be packed in the carton in endwise relation to each other, and means moving obliquely to the direction of advance of the merchandise for engaging the merchandise at one end thereof and push the same into the cartons while continuously impelled.

12. In a carton loading machine, a combination of supporting means for sustaining a collapsed carton by its flaps extending from opposite ends of the carton, a blade operative to enter the collapsed carton to initially open the same, means operative upon the partially opened carton to complete the opening thereof while the carton remains sustained through its flaps on said supporting means, and means for impelling cartons and merchandise to be packed in the carton in endwise relation to each other, and means for pushing the merchandise into the cartons while in continuous motion.

13. In a carton loading machine, a combination of supporting means for sustaining a collapsed carton by its flaps extending from opposite ends of the carton, a blade operative to enter the collapsed carton to initially open the same, means operative upon the partially opened carton to complete the opening thereof while the carton remains sustained through its flaps on said supporting means, and means for impelling cartons and merchandise to be packed in the carton in endwise relation to each other, means for pushing a plurality of pieces of merchandise simultaneously into respective cartons while the carton continues in advancing motion, and means for closing the ends of the cartons after loaded.

14. In a carton loading machine, the carton having closure flaps extending from opposite ends of a wall of a carton, means for sustaining the collapsed carton by the closure flaps, means for compressively engaging the collapsed carton while sustained by and intermediate of the closure flaps to open the carton, continuous means for impelling open ended cartons at relative spacing, continuous moving means having open ended merchandise holding trays moving along the open side of the spaced cartons, and means movable endwise into and coordinately with said trays for transferring the merchandise from the trays into the cartons.

15. In a carton loading machine, the carton having closure flaps extending from opposite ends of a wall of a carton, means for sustaining the collapsed carton by the closure flaps, a blade operative to enter the collapsed carton to partially open the same, means for compressively engaging the collapsed carton while sustained by and intermediate the closure flaps to completely open the carton, continuous means for impelling open ended cartons at relative spacing, continuous moving means having open ended merchandise holding trays moving along the open side of the spaced cartons, and means movable endwise into and coordinately with said trays for transferring the merchandise from the trays into the cartons.

16. In a carton loading machine, the carton having closure flaps extending from opposite ends of a wall of a carton, means for sustaining the collapsed carton by the closure flaps, a blade operative to enter the collapsed carton to partially open the same, means for compressively engaging the collapsed carton while sustained by and intermediate of the closure flaps to completely open the carton, superposed rails between which the carton is opened to sustain the same against collapse, continuous means for impelling open ended cartons at relative spacing, continuous moving means having open ended merchandise holding trays moving along the open side of the spaced cartons, and means movable endwise into and coordinately with said trays for transferring the merchandise from the trays into the cartons.

17. In a cartoning machine, means for continuously impelling cartons in relative spacing, the cartons having closure tucking flaps at relatively opposite ends thereof, means for creasing the flaps successively along a plurality of lines crosswise of the flaps and in a closing direction, flapper means for closing said flaps, and paddler means for finally and compactly closing the flaps.

18. In a cartoning machine, means for continuously impelling cartons in relative spacing, the cartons having closure tucking flaps at relatively opposite ends thereof, means for creasing the flaps in a closing direction, comprising, a stationary blade for each flap, a rotary blade cooperating with the stationary blade creasing the flap when engaged between the blades, and means for closing the flaps.

19. In a carton machine, means for continuously impelling cartons in relative spacing, the cartons having closure tucking flaps at relatively opposite ends thereof, swinging wing members each engaging with a tucking flap at a respective end of the carton for closing the same, and means for moving the wings coordinately in a direction with the impelled carton while swinging to close the flaps.

20. In a carton machine, means for continuously impelling cartons in relative spacing, the cartons having closure tucking flaps at relatively opposite ends thereof, swinging wing members each engaging with a tucking flap at a respective end of the carton for closing the same, and means for moving the wings coordinately in a direction with the impelled carton while swinging to close the flaps, curved stationary guides respectively cooperating with said wings for positively directing the tucking end of the flaps into the carton, and means for compressibly engaging the carton at its opposite end for finally compressing the tucked flaps.

21. In a carton machine, means for continuously impelling cartons in relative spacing, the cartons having closure tucking flaps at relatively opposite ends thereof, swinging wing members each engaging with a tucking flap at a respective end of the carton for closing the same, means for moving the wings coordinately in a direction with the impelled carton while swinging to close the flaps, and curved stationary guides respectively cooperating with said wings for positively directing the tucking end of the flaps into the carton.

22. In a carton machine, means for continuously impelling cartons in relative spacing, the cartons having closure tucking flaps at relatively opposite ends thereof, swinging wing members each engaging with a tucking flap at a respective end of the carton for closing the same, and means for moving the wings coordinately in a direction with the impelled carton while swinging to close the flaps, and means for finally compressing the tucked flaps.

23. In a carton machine, means for continuously impelling cartons in relative spacing, the cartons having closure tucking flaps at relatively opposite ends thereof, means movable in an arc and coordinately with the impelled cartons for swinging the tucking flaps into closed position, and means transversely coordinating with the impelled cartons for compressibly engaging a carton from opposite ends for finally compressing the tucked flaps.

24. In a carton machine, means for continuously impelling cartons in relative spacing, the cartons having closure tucking flaps at relatively opposite ends thereof, means movable in an arc and coordinately with the impelled cartons for swinging the tucking flaps into closed position, and means transversely coordinating with the impelled cartons for compressibly engaging a carton from opposite ends for finally closing the flaps, said last named means carrying a blade for engaging into the cartons between the tucking end of the flap and adjacent wall of the carton after the flaps have been initially closed.

RUEL ANDERSON JONES.